(12) United States Patent
Darabi et al.

(10) Patent No.: US 12,688,629 B2
(45) Date of Patent: Jul. 21, 2026

(54) STYLIZED GLYPHS USING GENERATIVE AI

(71) Applicant: Adobe Inc., San Jose, CA (US)

(72) Inventors: Aliakbar Darabi, San Jose, CA (US); Alexandru Chiculita, San Jose, CA (US); Alexandru Vasile Costin, San Jose, CA (US); Brent Getlin, San Jose, CA (US); Nathaniel McCully, San Jose, CA (US); Oliver Brdiczka, San Jose, CA (US)

(73) Assignee: Adobe Inc., San Jose, CA (US)

( * ) Notice: Subject to any disclaimer, the term of this patent is extended or adjusted under 35 U.S.C. 154(b) by 217 days.

(21) Appl. No.: 18/318,567

(22) Filed: May 16, 2023

(65) Prior Publication Data

US 2024/0127510 A1     Apr. 18, 2024

Related U.S. Application Data

(60) Provisional application No. 63/379,892, filed on Oct. 17, 2022.

(51) Int. Cl.
*G06T 11/60* (2026.01)
*G06T 7/00* (2017.01)

(52) U.S. Cl.
CPC ............ *G06T 11/60* (2013.01); *G06T 7/0002* (2013.01); *G06T 2207/30168* (2013.01)

(58) Field of Classification Search
CPC ................... G06T 11/60; G06T 7/0002; G06T 2207/30168; G06T 11/203; G06F 16/50
See application file for complete search history.

(56) References Cited

U.S. PATENT DOCUMENTS

| | | | |
|---|---|---|---|
| 6,091,505 A | | 7/2000 | Beaman et al. |
| 9,473,904 B2 | | 10/2016 | Bennett |
| 10,074,200 B1 | | 9/2018 | Yeturu |
| 10,693,981 B2 | | 6/2020 | Galai et al. |
| 10,713,821 B1 | | 7/2020 | Surya et al. |
| 10,922,718 B2 | | 2/2021 | Hong et al. |
| 11,537,765 B1 * | | 12/2022 | Jacobs, II .......... G06Q 30/0283 |
| 2002/0101450 A1 * | | 8/2002 | Magendanz ............ G06F 9/451 |
| | | | 715/764 |
| 2004/0039796 A1 | | 2/2004 | Watkins |
| 2008/0208379 A1 | | 8/2008 | Weel |
| 2008/0304807 A1 | | 12/2008 | Johnson et al. |
| 2010/0161729 A1 | | 6/2010 | Leblanc et al. |

(Continued)

FOREIGN PATENT DOCUMENTS

KR     10-2021-0025856 A     3/2021

OTHER PUBLICATIONS

Non-Final Office Action, U.S. Appl. No. 18/306,048, Nov. 20, 2024, 19 pages.

(Continued)

*Primary Examiner* — Jin Cheng Wang
(74) *Attorney, Agent, or Firm* — Nicholson De Vos Webster & Elliott LLP

(57) ABSTRACT

A method includes receiving an input including a target style and a glyph. The method further includes masking the glyph. The method further includes generating a stylized glyph by a glyph generative model using the masked glyph. The method further includes rendering the stylized glyph as a unicode stylized glyph.

20 Claims, 15 Drawing Sheets

(56)　　　　　References Cited

U.S. PATENT DOCUMENTS

| | | | |
|---|---|---|---|
| 2012/0231774 A1* | 9/2012 | Blades | H04W 4/14 |
| | | | 455/414.4 |
| 2018/0300294 A1* | 10/2018 | Dhanuka | G06F 40/109 |
| 2019/0114661 A1 | 4/2019 | Bennion et al. | |
| 2019/0251721 A1 | 8/2019 | Hua et al. | |
| 2020/0265113 A1* | 8/2020 | Dubey | G06F 40/103 |
| 2020/0272689 A1* | 8/2020 | Kumawat | G06F 18/213 |
| 2021/0042381 A1* | 2/2021 | Kumawat | G06T 15/005 |
| 2021/0044674 A1 | 2/2021 | Govan et al. | |
| 2021/0073323 A1* | 3/2021 | Fisher | G06T 3/02 |
| 2021/0166013 A1* | 6/2021 | Tensmeyer | G06V 30/2276 |
| 2021/0200824 A1 | 7/2021 | Kim et al. | |
| 2021/0272341 A1* | 9/2021 | Swaminathan | G06N 3/08 |
| 2022/0108417 A1 | 4/2022 | Liu et al. | |
| 2022/0129618 A1* | 4/2022 | Sawaf | G06T 11/203 |
| 2022/0229865 A1 | 7/2022 | Mccarty et al. | |
| 2022/0357914 A1 | 11/2022 | Krishnamurthy et al. | |
| 2023/0281691 A1 | 9/2023 | Buzzell et al. | |
| 2024/0070390 A1* | 2/2024 | Tiku | G06V 20/20 |
| 2025/0061623 A1* | 2/2025 | Liu | G06V 30/1916 |
| 2025/0077761 A1* | 3/2025 | Liu | G06N 3/08 |
| 2025/0191398 A1* | 6/2025 | Liu | G06V 10/774 |

OTHER PUBLICATIONS

Office Action , GB App. No. 2312477.9, Feb. 23, 2024, 7 pages.

Office Action, GB App. No. P11746-GB, Feb. 5, 2024, 06 pages of Original Document only.

Non-Final Office Action, U.S. Appl. No. 18/306,048, Oct. 1, 2025, 25 pages.

Final Office Action, U.S. Appl. No. 18/306,048, Jun. 10, 2025, 23 pages.

Final Office Action, U.S. Appl. No. 18/322,073, Jul. 9, 2025, 40 pages.

Non-Final Office Action, U.S. Appl. No. 18/322,073, Apr. 10, 2025, 33 pages.

* cited by examiner

1200

RECEIVING AN INPUT INCLUDING A TARGET STYLE AND A GLYPH
1202

MASKING THE RECEIVED GLYPH  1204

GENERATING, USING A GLYPH GENERATIVE MODEL, A STYLIZED GLYPH BASED ON THE TARGET STYLE AND THE MASKED GLYPH
1206

RENDERING THE STYLIZED GLYPH AS A UNICODE STYLIZED GLYPH
1208

STYLIZED GLYPHS USING GENERATIVE AI

CROSS-REFERENCE TO RELATED APPLICATIONS

This application claims the benefit of U.S. Provisional Application No. 63/379,892, filed Oct. 17, 2022, which is hereby incorporated by reference.

BACKGROUND

Digital tools allow artists to manifest creative efforts in a digital workspace. For example, an artist (or other creator) stylizes text in the digital workspace. Styles applied to text include color, font, shadows, blurred edges, underlines, highlights, size, and the like. However, the degree of stylistic creativity is limited to predefined styles of the digital workspace.

SUMMARY

Introduced here are techniques/technologies that render stylized glyphs provided a description of a target style using a natural language prompt. A glyph is all (or a portion) of a character of text. A glyph styling system described herein combines generative imaging run on a style description, masking techniques on character outlines, and a final generation from a masked seed with optical character recognition (OCR) filtering to produce a stylized glyph. Generating stylized glyphs in this manner preserves readability and consistency of a selected glyph, while still applying the described style to all (or a portion of) a glyph. The glyph styling system renders infinite font variations and decorative schemes as editable glyphs.

More specifically, in one or more embodiments, the glyph styling system seeds an image generator with a fill and/or mask before applying/leveraging a style description. In this manner, the character consistency is preserved. In some embodiments, the glyph styling system may execute OCR to filter out variations of generated character images that are unreadable (or otherwise of a poor quality) based on one or more attributes. In yet other embodiments, the generated stylized characters (e.g., generated glyphs) are editable because the glyph styling system keeps the character data in unicode, and the glyph styling system implements an editing capability. That is, the generated style overlays a glyph.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a glyph styling system that provides stylized glyphs given a description of a target style. One conventional approach involves manually editing every character that is to be stylized, which is laborious and time consuming. Moreover, the quality of the stylized character may be inconsistent across characters in a character set. Other conventional approaches automatically generate images from a description of a style. However, these generated images fail in generating stylized glyphs. These approaches do not understand a description of a target style. As a result, conventional approaches create images that are aggregations of characters and style. The resulting composition of the generated image does not preserve the original details of the received characters. Moreover, the result of such conventional approaches are images which are not editable as characters of text and/or treated like characters of text.

To address these and other deficiencies in conventional systems, the glyph styling system of the present disclosures generates editable stylized glyphs (or characters or strings). The glyph styling system leverages AI image generation to enable users to input a natural language text description for styling editable characters in a text block element. An additional advantage is keeping the stylized characters within the text block. This allows the stylized characters to follow text area resize and reflow that would otherwise require the user to break apart the text area and manually lay out glyphs such that the glyphs appear as if they're part of the text block. Specifically, the glyph styling system generates images based on a style description, executes masking techniques on character outlines, and filters a stylized glyph determined from a masked seed using OCR to produce a stylized glyph. The visual consistency of stylized glyphs may be maintained by storing seeds used to generate such stylized glyphs.

Providing stylized glyphs to a user reduces computing resources such as power, memory, and bandwidth spent tuning, creating, or otherwise adapting glyphs to a specific style. For example, computing resources are not wasted by a user's attempt to manifest the user's creative efforts.

Instead, a user simply describes the user's creative intent in a natural language description and receives a stylized glyph. Accordingly, computing resources such as power, memory, and bandwidth are preserved as the time associated with creating stylized glyphs is reduced.

Figure 1:
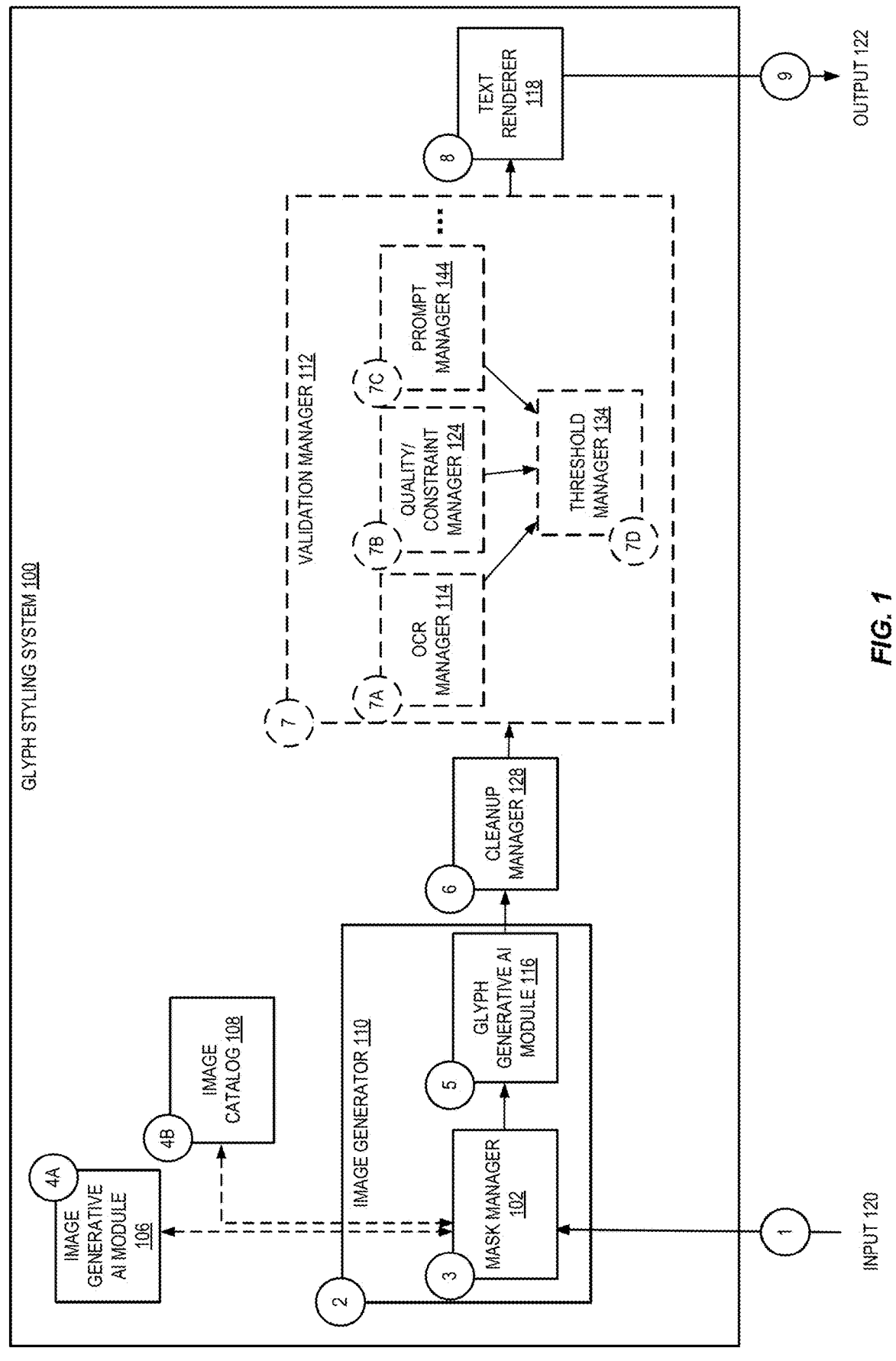
FIG. 1 illustrates a diagram of a process of generating stylized font glyphs in accordance with one or more embodiments.

FIG. 1 illustrates a diagram of a process of generating stylized font glyphs, in accordance with one or more embodiments. As shown in FIG. 1, embodiments include a glyph styling system 100. The glyph styling system 100 includes an image generator 110, a image generative AI module 106, an image catalog 108, a validation manager 112, and a text renderer 118. In operation, the glyph styling system 100 leverages AI image generation to enable users to input a natural language text description for styling editable characters in a text block element. The text block element includes one or more glyphs to be stylized and/or glyphs that have been stylized.

In some embodiments, the glyph styling system 100 is enabled responsive to a user input. For example, a user may select one or more characters of a displayed string of text and subsequently interact with a button to enable the glyph styling system (press a button, click on a button). Responsive to being enabled, the glyph styling system 100 generates stylized font glyphs (or characters) of the selected one or more characters of the displayed string of text, as described herein.

For ease of description, the present disclosure describes the glyph styling system 100 in terms of being applied to a glyph, but it should be appreciated that the glyph styling system 100 can be applied to portions of one or more strings (e.g., a glyph, a character, a string, an entire text box, etc.). As such, the term "glyph" in the present disclosure applies to a character, a string, an text box including one or more strings/characters, etc.

At numeral 1, the glyph styling system 100 receives an input 120. The input 120 includes a prompt (e.g., a natural language description) of a style and a selection of text to be stylized. The prompt may be an arbitrary string of descriptive text that is used to generate a stylized rendition of a glyph, as described herein. The descriptive text of the prompt describes the target style of the selected text to be stylized. In some embodiments, the prompt includes a description of the text to be stylized. The selection of text includes a glyph (e.g., a portion of a character, a character, one or more strings, or an entire text box). In some embodiments, the selected glyph may be a received by the glyph styling system 100 as a rasterized image of the glyph. In other embodiments, one or more modules of the glyph styling system 100 (such as the image generator 110) may convert the glyph into a rasterized image. The glyphs received by the glyph styling system 100 may originate from any alphabet. For example, an emoji may be considered a glyph.

If a user revises the prompt and/or the selection of text to be stylized, the glyph styling system 100 receives a revised input 120. As a result, the processes of the glyph styling system 100 are performed again. For example, as described with reference to FIGS. 9A-9B and 10A-10B, editing a glyph within a text block will regenerate a new stylized rendition of the glyph automatically using the previous style settings of the text box. In some embodiments, style settings are considered "neural glyph" settings.

In some embodiments, input 120 can include one or more parameters of a selected glyph. For example, parameters of the glyph include a size, a font, a strikethrough attribute, an underline attribute, a bold attribute, an italic style attribute, a color, a highlight, a shadow, a blur, and the like. Such parameters of the glyph may be extracted from the selected glyph using any suitable means.

In some embodiments, input 120 can include one or more parameters of the glyph styling system. For example, a user may identify a number of stylized glyphs generated by the glyph styling system, a user may identify where the images for the glyph styling system are retrieved from (e.g., generated by the image generative AI module 106, as described herein, pulled from an image catalog 106, etc.), a user may identify a degree of stylization, a user may identify a evaluated attributes of the stylized glyph (e.g., a quality attribute, a legibility attribute, a constraint attribute, etc.), and the like. The degree of stylization indicates a degree of fidelity to an image. For example, a high degree of stylization may result in a stylized glyph that is more artistically expressive than a stylized glyph with a low degree of stylization. As a result, a high degree of stylization corresponds to a low degree of fidelity to an image.

At numeral 2, an image generator 110 receives the input 120. The image generator 110 applies a style to the selected glyph (as part of input 120). As shown, the image generator 110 executes a mask manager 102 and a glyph generative AI module 116 to apply a style to the glyph.

At numeral 3, the mask manager 102 generates a mask of the glyph to be stylized. The glyph to be stylized is the received glyph as part of input 120. The mask manager 102 masks the glyph to be stylized by removing a background of the glyph. For example, the mask manager 102 may perform any one or more edge detection algorithms (including Sobel, Canny, and/or Prewitt algorithms) to detect the edge of the glyph, differentiating the glyph from the background. In operation, the mask manager 102 compares intensity values of neighboring pixels to identify differences in intensity values satisfying a boundary threshold. By identifying intensity values of pixels that satisfy the boundary threshold, the mask manager 102 identifies an edge of the glyph. As a result, the mask manager 102 extracts the glyph from the background to generate a masked glyph.

In some embodiments, an image is applied to masked glyph. The image applied to the masked glyph may be one or more patterns, one or more colors, one or more textures, and/or one or more composed scenes obtained from the image generative AI module 106 and/or the image catalog 108. The mask manager may apply the image to the masked glyph using any one or more methods. For example, the mask manager 102 may cut the image such that the shape (e.g., dimensions or size) of the image are equal to the shape of the masked glyph. Subsequently, the mask manager 102 may overlay or otherwise apply the image cutout to the masked glyph. In a different example, the mask manager 102 may perform UV mapping to map a two dimensional texture map (e.g., a texture retrieved from the image catalog 108 and/or generated from the image generative AI module 106, as described herein) to a three dimensional glyph. In this manner, the masked glyph is a three-dimensional stylized glyph.

The mask manager 102 obtains an image to apply to the glyph using the description of the target style received as part of input 120. The mask manager 102 queries the image generative AI module 106 at numeral 4A and/or the image catalog 108 at numeral 4B for one or more images based on the description of the style received as part of the input 120 (e.g., the prompt including the description of the target style). In some embodiments, the mask manager 102 queries the image generative AI module 106 and/or the image catalog 108 for images responsive to strings extracted from the prompt. In other embodiments, the mask manager 102 performs any semantic similarity technique to extract semantically similar terms from the prompt. In this manner, the mask manager 102 queries the image generative AI module 106 and/or the image catalog for images semantically related to the target style described in the prompt. In some embodiments, the mask manager 102 queries the image catalog 108 and/or the image generative AI module 106 using both exact strings extracted from the prompt and semantically related strings extracted from the prompt. In some embodiments, the mask manager 102 performs one or more spell checks, grammatical checks, and the like on the received prompt to revise any errors in the prompt. Subsequently, the mask manager 102 queries the image catalog 108 and/or the image generative AI module 106 as described herein.

At numeral 4A, the image generative AI module 106 generates images using the query received from the mask manager 102. As described herein, the query can include the description of the target style (e.g., the prompt), semantically related terms to the description of the target style, and/or any other parameters received as part of input 120 (e.g., color, font, highlight, shadow, bold, size, etc.).

As part of the image generation process performed by the image generative AI module 106, the image generative AI module 106 uses a seed. In some embodiments, the image generative AI module 106 creates the seed. The seed is an initialization state for a deterministic process such as generating the image by the image generative AI module 106. Specifically, the seed includes any configuration settings of one or more machines (or one or more virtual machines) executing the image generative AI module 106 and the input to the image generative AI module 106 such as the description of the target style (e.g., the prompt), semantically related terms to the description of the target style, and/or any other parameters received as part of input 120 (e.g., color, font, highlight, shadow, bold, size, etc.). Configuration settings can include the time that the image generative AI module 106 is being executed to generate the image. Additionally or alternatively, the seed can include the initialized noise that is denoised to generate the image according to the prompt (and/or any additional parameters of the prompt).

The image generative AI module 106 may be any generative AI configured to generate an image using a natural language prompt (e.g., GANs, diffusion models, etc.). The image generative AI module 106 may be any artificial intelligence including one or more neural networks. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Generative models are described in more detail in FIGS. 5-6.

At numeral 4B, the image catalog 108 retrieves images using the query received from the mask manager 102. As described herein, the query can include the description of the target style (e.g., the prompt), semantically related terms to the description of the target style, and/or any other parameters received as part of input 120 (e.g., color, font, highlight, shadow, bold, size, etc.).

The image catalog 108 is a data store of images accessible to the mask manager 102. The image catalog 108 may be a database, server, or an application that may be hosted by the glyph styling system 100, hosted by one or more external systems, or some combination (e.g., a cloud storage system). The image catalog 108 may include uploaded images by one or more users, computer-generated images, images that may be purchased, and the like. In some embodiments, the image catalog 108 is configured to query one or more additional systems/applications for images.

In some embodiments, the mask manager 102 processes an image (e.g., an image received by the image generative AI module 106 and/or the image catalog 108) and/or the masked glyph. In a first example, responsive to obtaining images from the image generative AI module 106 and/or image catalog 108, the mask manager 102 performs one or more filtering operations. Such filtering operations may remove received images based on one or more constraints (e.g., parental controls) and/or user preferences (e.g., a number of stylized glyphs to be generated).

In another example, the mask manager 102 may generate a processed masked glyph by performing a blur operation on the masked glyph with the applied image (e.g., the image received by the image generative AI module 106 and/or the image catalog 108 and mapped to the glyph). By blurring the masked glyph, the glyph generative AI module 116 receiving the blurred masked glyph is able to generate styles that are not limited to the bounds of the mask. In other words, blurring the masked glyph (e.g., processing the masked glyph) extends the footprint of the masked glyph such that the glyph generative AI module 116 may generate visual elements outside of the masked glyph.

The mask manager 102 may also generate a noisy mask by injecting noise into the masked glyph. For example, the mask manager 102 may first generate a normal noise distribution with a mean at a parameter obtained from input 120 (e.g., a value of a font color). For instance, the font color extracted from the selected glyph may be a RGB value that is used as the mean for a gaussian noise distribution. In some embodiments, the mask manager 102 blurs the noise. Subsequently, the mask manager 102 applies the mask (e.g., the blurred masked glyph, as described above) to noise (e.g., the blurred noise). For example, the mask manager 102 performs blure(noise)*mask, where noise=generate_normal (mean=RGB value of font color) and mask=blure(glyph mask). In this manner, a masked noisy glyph is generated.

In some embodiments, the mask manager 102 is configured to contrast the masked glyph (e.g., the masked noisy glyph, the blurred glyph, etc.) with a background, creating a contrasting mask. Specifically, the mask manager 102 may determine an inverse of a parameter of the input 120 (e.g., a font color of the received glyph). For example, if the RGB value of the font color is (255, 0, 0), the inverse of the font color is (0, 255, 255). The mask manager 102 creates the contrastive background by taking the inverse of the mask. For example, the mask manager 102 may perform (1-mask)* contrasting background. The mask manager 102 applies the contrastive background to the masked glyph to create the contrasting mask. For example, the contrasting mask may be determined by blure(noise)*mask+(1-mask)*contrasting background.

In one example, the mask manager 102 applies noise to the masked glyph (e.g., in the foreground) and a contrasting color is the background. By creating such a contrasting mask, the mask manager 102 introduces artifacts/variations that provide the glyph generative AI module 116 with more content to create a stylized glyph. For example, the created stylized glyph may visually appear more textured responsive to the variations (e.g., artifacts) of the contrasting mask. If the glyph generative AI module 116 stylized glyphs using a clean glyph input (e.g., not the contrasting mask), then the glyph generative AI module 116 may not create a diverse range of stylized glyphs.

The mask manager 102 may generate a number of processed masked glyphs equal to the number of received images (from the image generative AI module 106 and/or image catalog 108) or the number of filtered images. In some implementations, the mask manager 102 passes a batch of one or more masked glyphs to the glyph generative AI module 116 at numeral 5. In other implementations, the mask manager 102 passes masked glyphs to the glyph generative AI module 116 at numeral 5 serially up to a number of times equal to the number of received images (from the image generative AI module 106 and/or image catalog 108) or to the number of filtered images. In other embodiments, the mask manager 102 passes (either serially or in a batch) one or more masked glyphs to the cleanup manager 128 at numeral 6.

At numeral 5 a glyph generative AI module 116 creates stylized glyphs using glyphs received from the mask manager 102. The glyph generative AI module 116 executed at numeral 5 may be the same or different from the image generative AI module 106 executed at numeral 4A.

As part of the glyph generation process performed by the glyph generative AI module 116, the glyph generation AI module 116 uses a seed. In some embodiments, the glyph generative AI module 116 creates the seed. As described herein, the seed is an initialization state for a deterministic process and can include any configuration settings of one or more machines (or one or more virtual machines) executing the glyph generative AI module 116. For example, configuration settings can include the time that the glyph generative AI module 116 is being executed to generate the stylized glyph. Specifically, the seed can include the initialized noise that is denoised to generate the stylized glyph according to the prompt (and/or any additional parameters of the input).

In operation, the glyph generative AI module 116 executed at numeral 5 generates a stylized glyph using the received masked glyph (e.g., the contrasting mask from the mask manager 102, the masked glyph with the image applied, the noisy masked glyph, or any other processing performed on the glyph as described above), the prompt (e.g., the natural language description of the target style received as part of input 120), and/or any other parameters received as part of input 120 (e.g., color, font, highlight, shadow, bold, size, etc.). By providing such inputs, the glyph generative AI module 116 is encouraged to stylize the glyph in the shape of the received masked glyph. In operation, the glyph generative AI module 116 generates the stylized glyph in latent space.

At numeral 6, the cleanup manager 128 receives the stylized glyph. The cleanup manager 128 is configured to clean the stylized glyph. For example, the glyph generative AI module 116 may produce a stylized glyph with visual elements in the background (e.g., outside the bounds of the stylized glyph). The cleanup manager 128 is configured to remove visual elements from the outside of the glyph (e.g., the background) using any suitable background removal technique. For example, the text renderer 118 may perform a background removal operation by identifying a subject and removing any background from behind the subject. In this manner, the subject of the stylized glyph is preserved. For example, the text renderer 118 may perform remove_background(select_subject(stylized glyph)).

In a non-limiting example, the glyph generative AI module 116 may produce a glyph with birds surrounding the glyph. The cleanup manager 128 removes such birds around the stylized glyph. Additionally or alternatively, the cleanup manager 128 cleans and/or smooths the stylized glyph by removing artifacts and/or noise from the stylized glyph. While the cleanup manager 128 is shown before the validation manager 112, in some embodiments, the cleanup manager 128 cleans up a glyph received from the validation manager 112. That is, the cleanup manager 128 is executed after the validation manager 112.

In some embodiments, the stylized glyph is passed to validation manager 112 at numeral 7. As described herein, the validation manager 112 is configured to evaluate one or more attributes of the stylized glyph using one or more managers. In some implementations, a user may specify the one or more attributes of the stylized glyph to be evaluated using a user preference received as part of input 120. Additionally or alternatively, the user may specify one or more managers to execute on the stylized glyph using a user preference received as part of input 120. In this manner, the user determines which attributes of the stylized glyph are evaluated (using the respective managers of the validation manager 112). In other embodiments, the stylized glyph is passed to the text renderer 118 at numeral 8.

At numeral 7, the validation manager 112 receives the stylized glyph from the cleanup manager 128. Alternatively, in some embodiments, the validation manager 112 receives a glyph directly from the image generator 110 (e.g., the mask manager 102, where the glyph has been processed and may include an applied image, or the glyph generative AI module 116).

The validation manager 112 evaluates one or more attributes of the stylized glyph using one or more managers. Each manager of the validation manager 112 may execute one or more validation algorithms, as described herein. For example, in some embodiments, at numeral 7A, an OCR manager 114 of the validation manager 112 may evaluate one or more attributes of the stylized glyph by performing one or more validation algorithms such as an OCR algorithm. In some embodiments, the OCR manager 114 implements an OCR algorithm to determine whether the stylized glyph is understandable as a glyph in an alphabet or otherwise legible. That is, the OCR manager 114 evaluates a "readability" attribute of a stylized glyph.

If the OCR algorithm executed by the OCR manager 114 recognizes the stylized glyph, then the OCR manager 114 determines that the stylized glyph is "readable" by a computer and therefore likely "readable" (or legible) by a human. In an example implementation, if the OCR manager 114 determines that the glyph is readable, then the OCR manager 114 passes a readability indicator to the threshold manager 134 at numeral 7D. If the OCR manager 114 determines the stylized glyph is not readable, then the validation manager 112 may discard the stylized glyph or revise the stylized glyph, as described herein.

In some embodiments, at numeral 7B, a quality/constraint manager 124 of the validation manager 112 may evaluate one or more attributes of the stylized glyph. For example, the quality/constraint manager 124 evaluates a quality attribute of the stylized glyph. In some embodiments, the quality/constraint manager 124 evaluates the quality attribute by performing one or more validation algorithms such as object recognition and/or object detection algorithms. In other embodiments, as described herein, one or more visual understanding models evaluate the quality attribute.

In a non-limiting example, an object recognition algorithm is used to recognize one or more objects of the stylized glyph. For example, the object recognition algorithm may recognize a tree responsive to the target description (received as part of input 120) describing a tree. In some embodiments, the stylized glyph is in the shape of a recognizable tree. In other embodiments, the stylized glyph includes a tree (e.g., the letter "L" may include one or more trees contained in the shape of the letter "L"). Other recognition algorithms may be implemented to recognize other aspects of the stylized glyph such as textures, colors, luminescence, and the like.

In an example implementation, if an object (as described in the prompt, for instance) is recognized as part of the stylized glyph, then the quality/constraint manager 124 determines that the stylized glyph is "high quality." In contrast, if the object recognition algorithm can not recognize one or more objects as part of the stylized glyph, then the quality/constraint manager 124 determines that the stylized glyph is "low quality." If the quality/constraint manager 124 determines that the stylized glyph is high quality (e.g., one or more objects are recognized), then the quality/constraint manager 124 passes a quality indicator to the threshold manager 134 at numeral 7D. If the quality/constraint manager 124 determines that the stylized glyph is low quality (e.g., no objects are recognized), then the validation manager 112 may discard the stylized glyph or revise the stylized glyph, as described herein.

Additionally or alternatively, the quality/constraint manager 124 may evaluate a constraint attribute of the stylized glyph. For example, the quality/constraint manager 124 evaluates the constraint attribute by comparing one or more attributes/parameters/characteristics of the stylized glyph to a database, a list, and the like of constrained attributes/parameters/characteristics.

For instance, as described above, the stylized glyph is generated by the glyph generative AI module 116 using at least an image applied to a masked glyph. The quality/constraint manager 124 may evaluate the image applied to the masked glyph by comparing the image (e.g., obtained from the image generative AI module 106 and/or obtained from the image catalog 108) to a database of protected images (or otherwise constrained images). In this manner, the quality/constraint manager 124 ensures that the stylized glyph is not generated using a protected image.

Additionally or alternatively, the quality/constraint manager 124 may compare the stylized glyph to a database of constrained strings/characters. In this manner, the quality/constraint manager 124 ensures that the stylized glyph does not say or mean something that is constrained (e.g., an explicit word). In an example implementation, responsive to performing one or more comparisons and determining that the stylized glyph does not satisfy a constraint (e.g., the stylized glyph does not contain an explicit word), the quality/constraint manager 124 passes a constraint indicator to the threshold manager 134 at 7D. If the stylized glyph does satisfy a constraint, (e.g., the quality/constraint manager 124 determines that the stylized glyph is based on a protected image, the stylized glyph includes an explicit word, etc.), then the validation manager 112 may discard the stylized glyph or revise the stylized glyph, as described herein.

In some embodiments, at numeral 7C, a prompt manager 144 of the validation manager 112 may evaluate one or more attributes of the stylized glyph. For example, the prompt manager 144 evaluates a prompt similarity attribute of the stylized glyph using one or more validation algorithms. In some embodiments, the prompt manager 114 is executed to evaluate the "quality" attribute, as described above.

In operation, the prompt manager 144 may employ a bootstrapping language-image pre-training model (BLIP), or any other descriptive model/visual understanding model as a validation algorithm. For example, the BLIP model may receive the stylized glyph and determine a prompt or a description of the stylized glyph. Subsequently, the prompt manager 144 may compare the generated prompt (or the generated description of the stylized glyph) to the input 120. For example, the prompt manager 144 may determine a similarity between the generated prompt and the input 120 by measuring a distance between the generated prompt and input 120. Specifically, the prompt manager 144 may determine a similarity using Levenshtein distance or any other method of determining a similarity between texts. In an example implementation, responsive to determining that the description of the stylized glyph (generated by the BLIP model) satisfies a threshold similarity to the input 120, the prompt manager 144 may pass a prompt indicator to the threshold manager 134. If the generated prompt does not satisfy the threshold similarity, the validation manager 112 may discard the stylized glyph or revise the stylized glyph, as described herein. In some embodiments, the prompt manager 144 uses BLIP (or other visual understanding models) to generate captions and answer questions associated with the stylized glyph. In these embodiments, the prompt manager 144 evaluates the quality attribute, for example, by determining that the generated captions are similar to the prompt received as part of input 120 (as described above).

The validation manager 112 may execute other mangers not shown. While the managers of the validation manager 112 are described as making binary decisions of one or more attributes of the stylized glyph (e.g., the stylized glyph is recognized by the OCR manager 114 or is not recognized by the OCR manager 114), it should be appreciated that the managers of the validation manager 112 may also score one or more attributes of the stylized glyph. For example, the quality/constraint manager 124 may determine a likelihood that an object of the stylized glyph is recognized.

Based on the determination made by one or more managers of the validation manager 112, then one or more adjustments may be made to the stylized glyph to preserve/improve one or more attributes of the glyph (e.g., the readability attribute of the stylized glyph determined by the OCR manager 114, the quality attribute of the stylized glyph determined by the quality/constraint manager 124, the indicator score determined by the threshold manager 134, etc.). As described herein with reference to FIG. 3, the validation manager 112 may be configured to correct stylized glyphs using a glyph adjuster and/or a glyph generative AI module.

In some embodiments, each of the managers of the validation manager 112 provide their corresponding indicator(s) (and/or scores) to the threshold manager 134. As described herein, in some embodiments, providing one or more indicators to the threshold manager 134 may indicate that the stylized glyph has satisfied an evaluation of an attribute determined by the respective manager. Subsequently, the threshold manager 134 determines whether a threshold number of indicators have been received. For example, the validation manager 112 passes the stylized glyph to the text renderer 118 responsive to the threshold manager 134 determining that a threshold number of indicators have been received. For example, if the threshold number of indicators is two, then the validation manager 112 passes the stylized glyph to the text renderer 118 responsive to receiving a quality indicator (from the quality/constraint manager 124, indicating that the stylized glyph is "high quality") and a readability indicator (from the OCR manager 114, indicating that the stylized glyph is legible). If the threshold manager 134 determines that a threshold number of indicators are not received, the validation manager 112 may discard the stylized glyph or revise the stylized glyph, as described herein.

In some embodiments, the threshold manager 134 weighs each of the indicators received from the managers. For example, the threshold manager 134 weighs an indicator received from the quality/constraint manager 134 (indicating that the stylized glyph is high quality) as 0.5. The threshold manager 134 may also weigh an indicator received from the quality/constraint manager 134 (indicating that the stylized glyph is based on a protected image) as −10. The threshold manager 134 may determine to pass the stylized glyph to the text renderer 118 responsive to the weighted indicators satisfying a threshold indicator score. If the stylized glyph does not satisfy the threshold indicator score, then the validation manager 112 may discard the stylized glyph or revise the stylized glyph, as described herein.

Responsive to the threshold manager 134 determining that a threshold has been satisfied (e.g., an indicator number threshold, an indicator score threshold), the threshold manager passe the stylized glyph to the text renderer 118.

At numeral 8, a text renderer 118 renders the stylized glyphs in real-time (e.g., on demand). The stylized glyphs are displayed using the text renderer in a rasterized image or a vector image form. The stylized glyphs are unicode such that the stylized glyph is an editable character, string, emoji, and the like. As described with reference to FIGS. 10A-10B, by creating stylized glyphs in unicode, the content of the stylized glyph is editable.

In some embodiments, one or more rendered stylized glyphs are cached. In this manner, the text renderer 118 does not need to re-render stylized glyphs that have been previously rendered. Accordingly, the text renderer 118 retrieves the stylized glyph from the cache and displays such stylized glyphs. For example, if the glyph styling system 100 receives an input "bee", the first stylized "e" in the string is cached by the text renderer 118. The text renderer 118 pulls the stylized "e" from the cache such that the text renderer 118 does not need to re-render the second "e" in the string "bee."

At numeral 9, a stylized rendition of the glyph (or string of text) generated by the glyph styling system 100 is output at output 122. The output 122 is displayed on one or more user devices and/or communicated to one or more downstream devices (e.g., servers, applications, systems, processors, or some combination). The downstream devices may perform subsequent processing on output 122.

Figure 2:
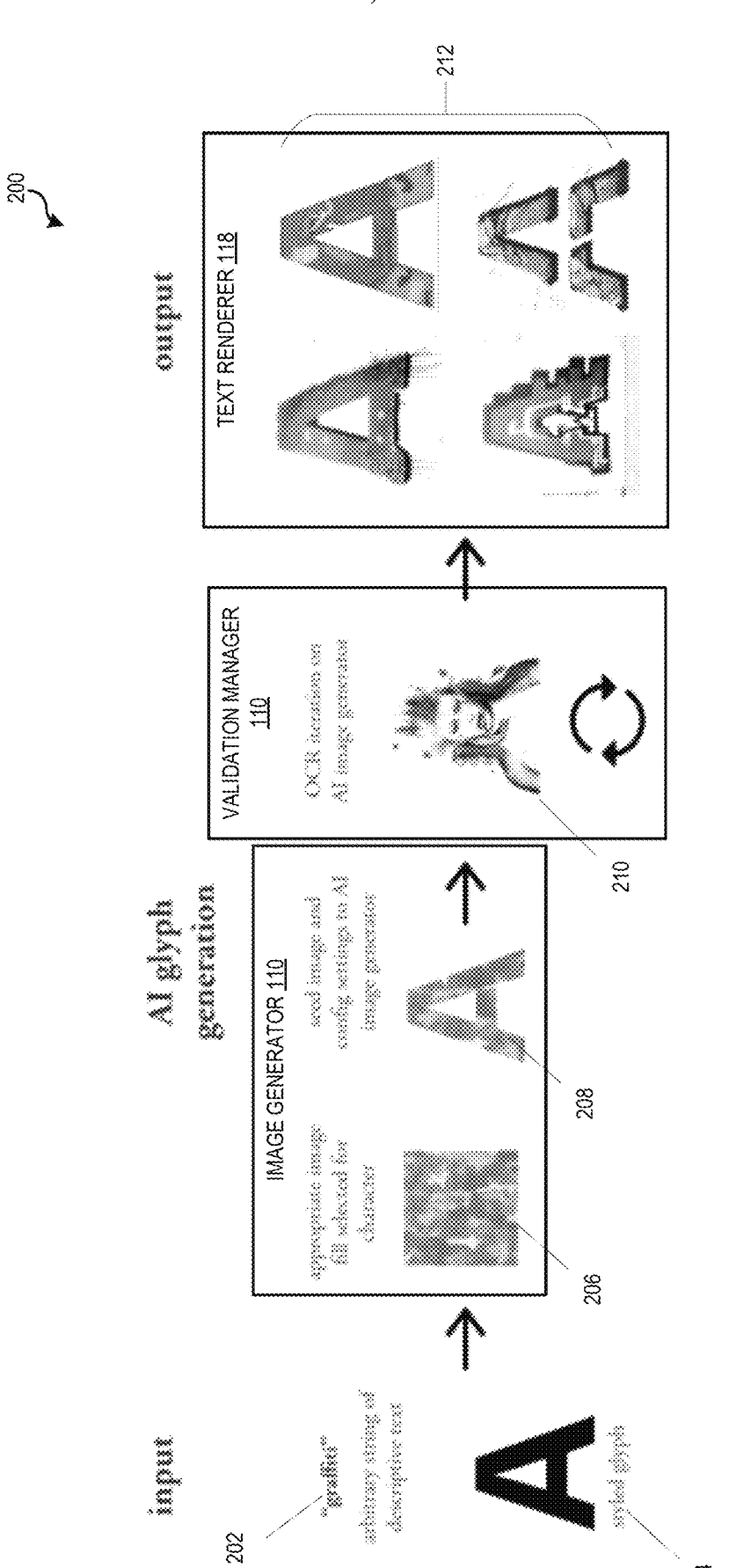
FIG. 2 illustrates a diagram of a process of the glyph styling system, in accordance with one or more embodiments.

FIG. 2 illustrates a diagram of a process of the glyph styling system, in accordance with one or more embodiments. In the example 200, a user input is received by the glyph styling system that includes a natural language description of a style (indicated at 202). In example 200, the style of glyph to be produced is based on "graffiti." Also included as an input to the glyph styling system is a glyph to be styled. In example 200, the glyph to be styled is "A." The user inputs are fed to the image generator 110, where an image 206 is retrieved from the image catalog 108 and/or the image AI generative module 106. As described herein, the image may include one or more patterns, one or more colors, an artistic composition (e.g., a scene), and the like. The mask manager 102 applies the image to the glyph to be styled at 208. The mask manager 102 also masks the image applied to the glyph, creating a masked glyph. In the example 200, the glyph generative AI module 116 receives the masked glyph 208 and generates a further stylized glyph (indicated by glyph 210) using the prompt.

The glyph 210 is processed by the validation manager 112 to evaluate one or more attributes of the stylized glyph. As shown, evaluating attributes of the stylized glyph is an iterative process that involves evaluating the attributes of the stylized glyph using various managers. As described herein, the validation manager 112 evaluates a readability attribute of a stylized glyph using OCR manager 114, the validation manager 112 evaluates a quality attribute of the stylized glyph using quality/constraint manager 124, the validation manager 112 evaluates a prompt similarity attribute of the stylized glyph using the prompt manager 144, and the like. As shown, the stylized glyph 210 is highly stylistic. In the example 200, the OCR manager 114 may determine that the stylized glyph 210 is not legible as an "A" and discard the stylized glyph.

The evaluated stylized glyph is then processed by text renderer 118 for output and display to the user. I text renderer 118 displays a set of evaluated stylized glyphs 210 based on various images applied to the glyph, various stylized glyphs determined by the glyph generative AI module (e.g., using various seeds), and the like. As shown, using a single input (e.g., the "graffiti" description indicated at 202 and the glyph to be stylized "A" indicated at 204), multiple stylized glyphs in a set of stylized glyphs 212 are generated by the glyph styling system 100, where each stylized glyph is understandable to a human as the selected input glyph 204.

Figure 3:
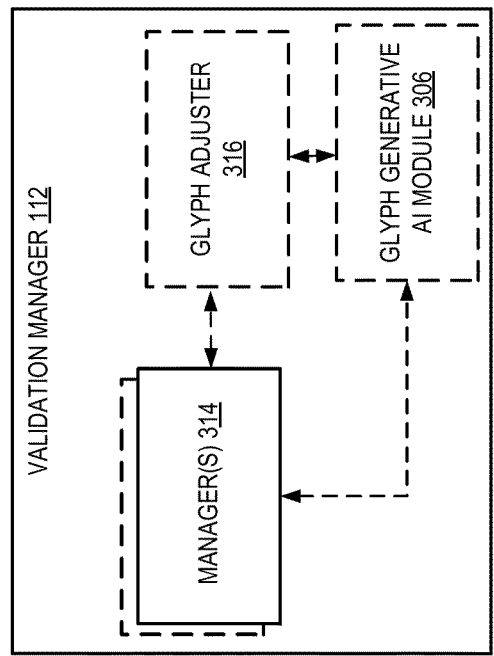
FIG. 3 illustrates an alternate implementation of the validation manager, in accordance with one or more embodiments.

FIG. 3 illustrates an alternate implementation of the validation manager, in accordance with one or more embodiments. As described herein, if one or more managers of the validation manager 112 (illustrated in FIG. 3 as manager(s) 314), determine not to validate the stylized glyph (e.g., the OCR manager 114 does not recognize the stylized glyph, the indicator score does not satisfy the threshold indicator score, the quality/constraint manager 124 determines that the stylized glyph is low quality, and the like), then one or more adjustments may be made to the stylized glyph to preserve/improve one or more attributes of the glyph (e.g., the readability attribute, the indicator score, etc.).

In some embodiments, the manager(s) 314 deployed by the validation manager 112 to adjust the stylized glyph are the manager(s) from which the threshold manager 134 did not receive an indicator. For example, the threshold manager 134 may not receive an indicator from the quality/constraint manager 124 if an object detection algorithm of the quality/constraint manager 124 does not recognize an object in the stylized glyph (or the likelihood of the recognized object in the stylized glyph does not satisfy a quality threshold). As a result, the quality/constraint manager 124 is re-executed to iteratively correct the stylized glyph.

In other embodiments, the manager(s) 314 deployed by the validation manager 112 to adjust the stylized glyph are the manager(s) selected by a user. For example, a user may indicate, using a user preference, that the stylized glyph output at output 122 should be legible. As a result, the validation manager 112 deploys the OCR manager 114 to iteratively revise a stylized glyph until the OCR manager 114 determines that the stylized glyph is legible (e.g., satisfies the readability attribute).

In a non-limiting example, the validation manager 112 begins the iterative process of revising a stylized glyph. Specifically, a prompt manager 144 of the validation manager 112 may indicate that a description of the stylized glyph, determined using any descriptive model such as BLIP, does not satisfy a threshold similarity to the prompt received as part of input 120. As a result, the prompt manager 144 may identify strings/characters of the input 120 that do not appear in the description of the stylized glyph. Additionally or alternatively, the prompt manager 144 may select semantically related terms to the input 120 using any semantic relationship analysis. As a result, the prompt manager 144 passes an adjusted prompt to the glyph generative AI module 306. In an example, the adjusted prompt includes semantically related terms related to input 120, repeated terms of input 120, removed terms, and the like.

In this manner, the glyph generative AI module 306 receives some combination of inputs such as adjustments to the stylized glyph, the stylized glyph, the target style (e.g., from the prompt as input 120), an adjusted prompt, images received from the image generative AI module 106 and/or image catalog 108, the masked glyph (e.g., received from the mask manager 102), a score determined by a manager 314 (e.g., a likelihood of readability determined by OCR manager 114, a likelihood of a detected objected determined by quality/constraint manager 124) and the like. In this manner, the prompt received by the glyph generative AI module 306 during the iterative glyph revision process is more fine-tuned than the prompt received by the glyph generative AI module 116 of the image generator 110 (illustrated in FIG. 1). As a result, the stylized glyph determined by the glyph generative AI module 306 may satisfy more evaluations performed by the managers 314 of the validation manager 112.

As part of the glyph generation process performed by the glyph generative AI module 306, the glyph generation AI module 306 uses a seed. In some embodiments, the glyph generative AI module 306 creates the seed. As described herein, the seed is an initialization state for a deterministic process and can include any configuration settings of one or more machines (or one or more virtual machines) executing the glyph generative AI module 306. For example, configuration settings can include the time that the glyph generative AI module 306 is being executed to generate the stylized glyph. Specifically, the seed can include the initialized noise that is denoised to generate the stylized glyph according to the prompt (and/or any additional parameters of the prompt). Additionally or alternatively, one or more manager(s) 314 pass one or more indicators corresponding to the stylized glyphs, one or more attribute scores of one or more stylized glyphs (e.g., a likelihood that the stylized glyph includes an object, a likelihood that the stylized glyph is legible, etc.), and the like, to a glyph adjuster 316. The glyph adjuster 316 is configured to improve one or more attribute scores of one or more stylized glyphs. For example, the glyph adjuster 316 may improve the likelihood that the glyph is legible by making the stylized glyph visually appear more similar to a glyph in any alphabet.

The glyph adjuster 316 may perform any suitable technique to improve an attribute of a stylized glyph. For example, to improve the readability attribute (or the legibility of the stylized glyph) the glyph adjuster 316 may perform template-based matching by comparing pixels of the stylized glyph to pixels of a glyph in any alphabet. The glyph adjuster 316 may add or remove pixels responsive to the comparison of the stylized glyph to the glyph in any alphabet. In this manner, pixels are added/removed to the stylized glyph such that the stylized glyph appears more visually similar to the glyph in the alphabet. Accordingly, the glyph adjuster 316 determines an adjusted glyph based on the adjustments (e.g., added/removed pixels) to the stylized glyph. By making the stylized glyph visually appear more similar to a glyph in an alphabet, the stylized glyph becomes more legible. As a result, in a next iteration performed by the OCR manager 114, the readability attribute of the stylized glyph should improve.

In some embodiments, the adjustments determined by the glyph adjuster 316 and/or the adjusted glyph are included as an input to the glyph generative AI module 306. As a result, the glyph generative AI module 306 generate an adjusted glyph. In other embodiments, the adjusted glyph (determined by the glyph generative AI module 306 and/or the glyph adjuster 316) is fed back to the manager(s) 314 of the validation manager 112 for re-evaluation of one or more attributes. In this manner, the validation manager 112 iteratively adjusts stylized glyphs to improve one or more attributes of the stylized glyph.

Figure 4:
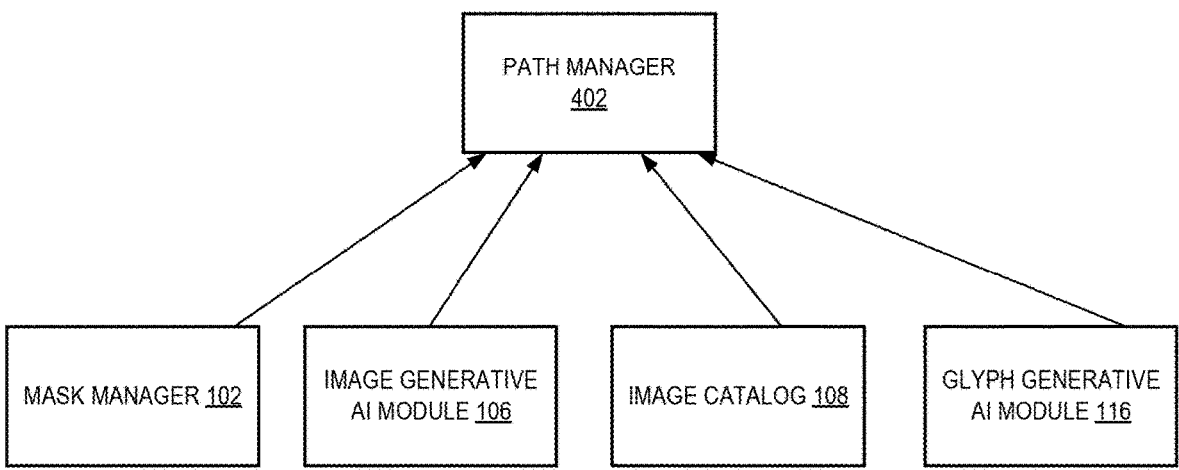
FIG. 4 illustrates a path manager, in accordance with one or more embodiments.

FIG. 4 illustrates a path manager, in accordance with one or more embodiments. The path manager 402 is configured to store a path used in rendering a stylized glyph. By storing the path, the path manager 402 ensures that each stylized glyph output as output 122 (e.g., each stylized glyph in a set of stylized glyphs) is unique. By ensuring that each stylized glyph is unique, the set of stylized glyphs becomes a diverse set of stylized glyphs. In operation, the path manager 402 ensures that the glyph styling system 100 is a deterministic system. The path information of the path includes any parameters used to render the stylized glyph as output 122. That is, the path manager 402 stores a history of stylized glyphs determined by the glyph styling system 100. In some embodiments, the history is stored with respect to any stylized glyph determined by the glyph styling system 100. In other embodiments, the history is stored with respect to a stylized glyph determined by the glyph styling system 100 associated with a particular input. In this manner, each stylized glyph in a set of stylized glyphs corresponding to the particular input (e.g., prompt and selected glyph) is unique.

In some embodiments, each module, manager, or component of the glyph styling system 100 provides path information to the path manager 402. For example, the path information may include the seeds used in any one or more of the generative AI modules (e.g., image generative AI module 106, glyph generative module 116, and/or glyph generative module 306 (not shown) used to revise glyphs in the validation manager 112).

The path may also include one or more images retrieved by the mask manager 102 from the generative AI module 106 and/or the image catalog 108. Additionally or alternatively, the path may include masked one or more glyphs (including the processed masked glyphs) determined by the mask manager 102. For example, the noise generated by the mask manager 102 used to process a masked glyph may be stored as part of the path. Additionally or alternatively, the blurred noise is stored as part of the path. As described herein, the noise generated by the mask manager 102 may be blurred and applied to the masked glyph. Also stored by the path manager 402 are the glyph attributes such as the font, size, italic style, bold style, underline, color, etc. Such attributes may be provided to the path manager 402 by the mask manager 102.

One or more other parameters associated with rendering a stylized glyph are also stored by the path manager 402 such as a degree of stylization (e.g., a degree of fidelity to an image or a masked glyph).

Responsive to receiving the path information, the path manager 402 may compare a current path to one or more stored paths. By comparing path information of a current path to one or more previously stored paths, the path manager 402 determines whether the current path is similar or dissimilar. For example, if the current path compared to a most recent previous path is different by a threshold amount (e.g., a threshold number of information fields, where an information field corresponds to information of the path), then the path manager 402 determines that the current path is different from the previously stored path.

Specifically, the path manager 402 may compare one information field (e.g., a seed of the glyph generative AI module 116 associated with a current path) to another information field (e.g., a seed of the glyph generative AI module 116 associated with a previous path). For example, the glyph generative AI module 116 may generate a stylized glyph at a first point in time. The seed used by the glyph generative AI module 116 may be stored by the path manager 402. Subsequently, at a second point in time after the first point in time, the glyph generative AI module may generate another stylized glyph (e.g., a current stylized glyph). The seed used by the glyph generative AI module 116 (e.g., a current seed) is stored by the path manager 402. By determining that the current path (or at least the current seed) is different from the previously stored seed, the path manager 402 ensures that the current stylized glyph is different from the previous stylized glyph. The path manager 402 may compare other path information stored in the path. Additionally or alternatively, the path manager 402 may compare multiple stored seeds (e.g., multiple stored paths including path information) to a current seed (or a current path).

In some embodiments, if the paths are too similar (e.g., a threshold number of information fields are similar), then the path manager 402 discards the stylized glyph associated with the current path. In some embodiments, the path manager 402 compares path information responsive to a user input. For example, a user may indicate a desire that each output be a different style.

Figure 5:
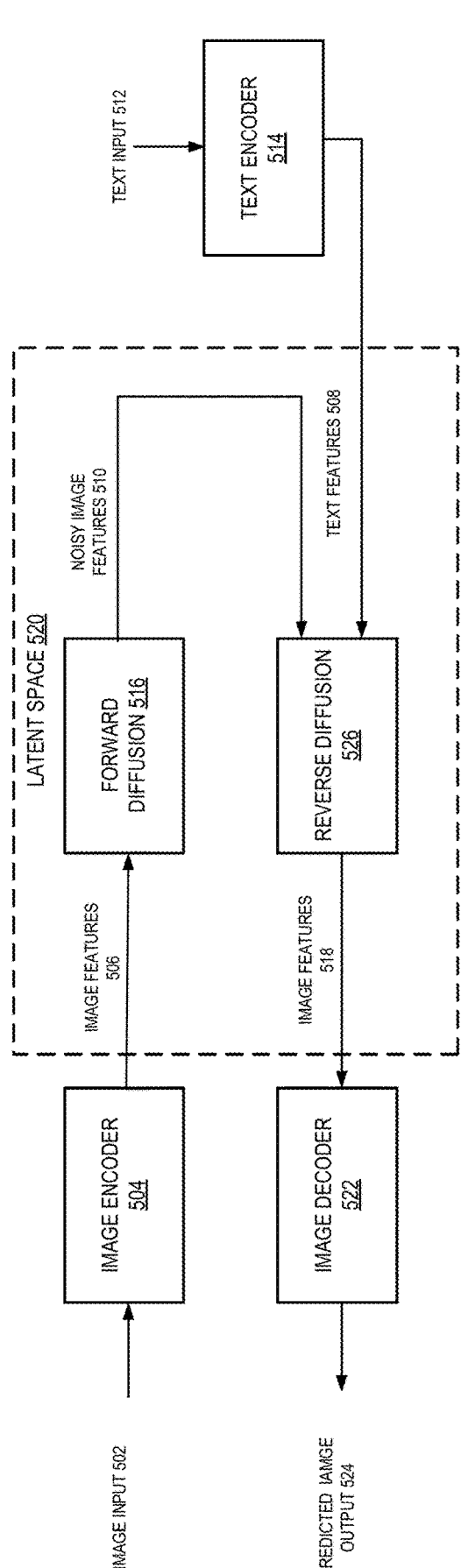
FIG. 5 illustrates an example implementation of a diffusion model, in accordance with one or more embodiments.

FIG. 5 illustrates an example implementation of training a diffusion model, in accordance with one or more embodiments. As described herein, the generative AI (implemented by image generative AI module 106, glyph generative module 116, and/or glyph generative AI module 306) can be performed using any suitable mechanism. In some embodiments, such generative AI is performed using a diffusion model.

A diffusion model is one example architecture used to perform generative AI. Generative AI involves predicting features for a given label. For example, given a label (or natural prompt description) "cat", the generative AI module determines the most likely features associated with a "cat." The features associated with a label are determined during training using a reverse diffusion process in which a noisy image is iteratively denoised to obtain an image. In operation, a function is determined that predicts the noise of latent space features associated with a label.

During training, an image (e.g., an image of a cat) and a corresponding label (e.g., "cat") are used to teach the diffusion model features of a prompt (e.g., the label "cat"). As shown in FIG. 5, an input image 502 and a text input 512 are transformed into latent space 520 using an image encoder 504 and a text encoder 514 respectively. As a result, latent image features 506 and text features 508 are determined from the image input 502 and text input 512 accordingly. The latent space 520 is a space in which unobserved features are determined such that relationships and other dependencies of such features can be learned. In some embodiments, the image encoder 504 and/or text encoder

514 are pretrained. In other embodiments, the image encoder 504 and/or text encoder are trained jointly.

Once image features 506 have been determined by the image encoder 504, a forward diffusion process 516 is performed according to a fixed Markov chain to inject gaussian noise into the image features 506. The forward diffusion process 516 is described in more detail with reference to FIG. 6. As a result of the forward diffusion process 516, a set of noisy image features 510 are obtained.

The text features 508 and noisy image features 510 are algorithmically combined in one or more steps (e.g., iterations) of the reverse diffusion process 526. The reverse diffusion process 526 is described in more detail with reference to FIG. 6. As a result of performing reverse diffusion, image features 518 are determined, where such image features 518 should be similar to image features 506. The image features 518 are decoded using image decoder 522 to predict image output 524. Similarity between image features 506 and 518 may be determined in any way. In some embodiments, similarity between image input 502 and predicted image output 524 is determined in any way. The similarity between image features 506 and 518 and/or images 502 and 524 are used to adjust one or more parameters of the reverse diffusion process 526.

Figure 6:
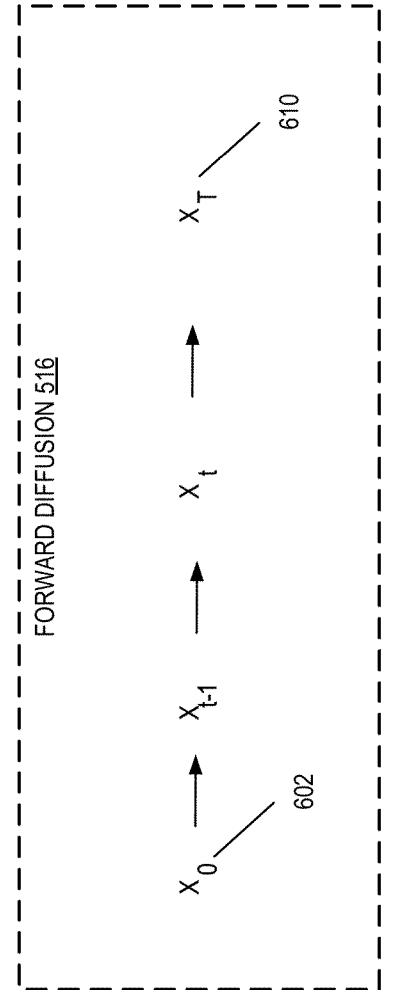
FIG. 6 illustrates the diffusion processes used to train the diffusion model, in accordance with one or more embodiments.
Figure 6:
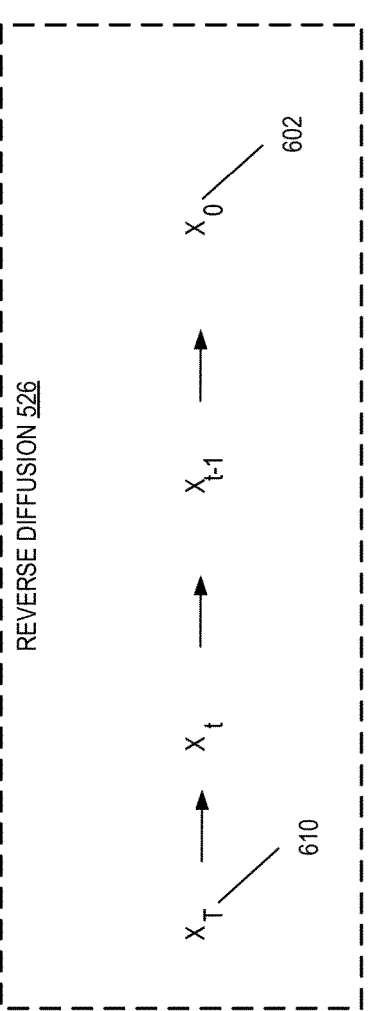

FIG. 6 illustrates the diffusion processes used to train the diffusion model, in accordance with one or more embodiments. The diffusion model may be implemented using any artificial intelligence/machine learning architecture in which the input dimensionality and the output dimensionality are the same. For example, the diffusion model may be implemented according to a u-net neural network architecture.

As described herein, a forward diffusion process adds noise over a series of steps (iterations t) according to a fixed Markov chain of diffusion. Subsequently, the reverse diffusion process removes noise to learn a reverse diffusion process to construct a desired image (based on a text input) from the noise. During deployment of the diffusion model, the reverse diffusion process is used in generative AI modules (e.g., image generative AI module 106, glyph generative AI module 116, glyph generative AI module 306) to generate images from input text. In some embodiments, an input image is not provided to the diffusion model.

The forward diffusion process 516 starts at an input (e.g., feature $X_0$ indicated by 602). Each time step t (or iteration) up to a number of T iterations, noise is added to the feature x such that feature $x_T$ indicated by 610 is determined. As described herein, the features that are injected with noise are latent space features. If the noise injected at each step size is small, then the denoising performed during reverse diffusion process 526 may be accurate. The noise added to the feature X can be described as a Markov chain where the distribution of noise injected at each time step depends on the previous time step. That is, the forward diffusion process 516 can be represented mathematically $$q(x_{1:T} \mid x_0) = \prod_{t=1}^{T} q(x_t \mid x_{t-1}).$$

The reverse diffusion process 526 starts at a noisy input (e.g., noisy feature $X_T$ indicated by 610). Each time step t, noise is removed from the features. The noise removed from the features can be described as a Markov chain where the noise removed at each time step is a product of noise removed between features at two iterations and a normal Gaussian noise distribution. That is, the reverse diffusion process 526 can be represented mathematically as a joint probability of a sequence of samples in the Markov chain, where the marginal probability is multiplied by the product of conditional probabilities of the noise added at each iteration in the Markov chain. In other words, the reverse diffusion process 526 is $$p_\theta(x_{0:T}) = p(x_t) \prod_{t=1}^{T} p_\theta(x_{t-1} \mid x_t), \text{ where } p(x_t) = N(x_t; 0, 1).$$

Figure 7:
FIG. 7 illustrates an example of stylized string, in accordance with one or more embodiments.
Figure 7:

FIG. 7 illustrates an example of a stylized string, in accordance with one or more embodiments. As shown, the prompt includes a string "Happy Birthday" stylized with balloons. The target description is "stylized with balloons" and the string to be stylized is "Happy Birthday." As shown at 702, glyphs are stylized using balloons such that the glyphs reflect the balloon style. Even though such style has been overlaid on the glyph, each of the characters of the strings "Happy Birthday" are legible such that a human understand the string "Happy Birthday." This is because the user has selected that the glyph styling system 100 verify that the stylized string is legible. Moreover, each glyph is editable. For example, a user may select a particular glyph in the set of glyphs and modify the selected glyph using a different style.

Figure 8:
FIG. 8 illustrates an example of applying the glyph styling system to an emoji, in accordance with one or more embodiments.

FIG. 8 illustrates an example of applying the glyph styling system to an emoji glyph, in accordance with one or more embodiments. As shown at 802, the emoji is selected as the glyph to be stylized and the prompt describes "blood dripping pumpkin." The stylized glyph generated by the glyph styling system 100 at 804 corresponds to the prompt as a user would understand the prompt.

Figure 9A:
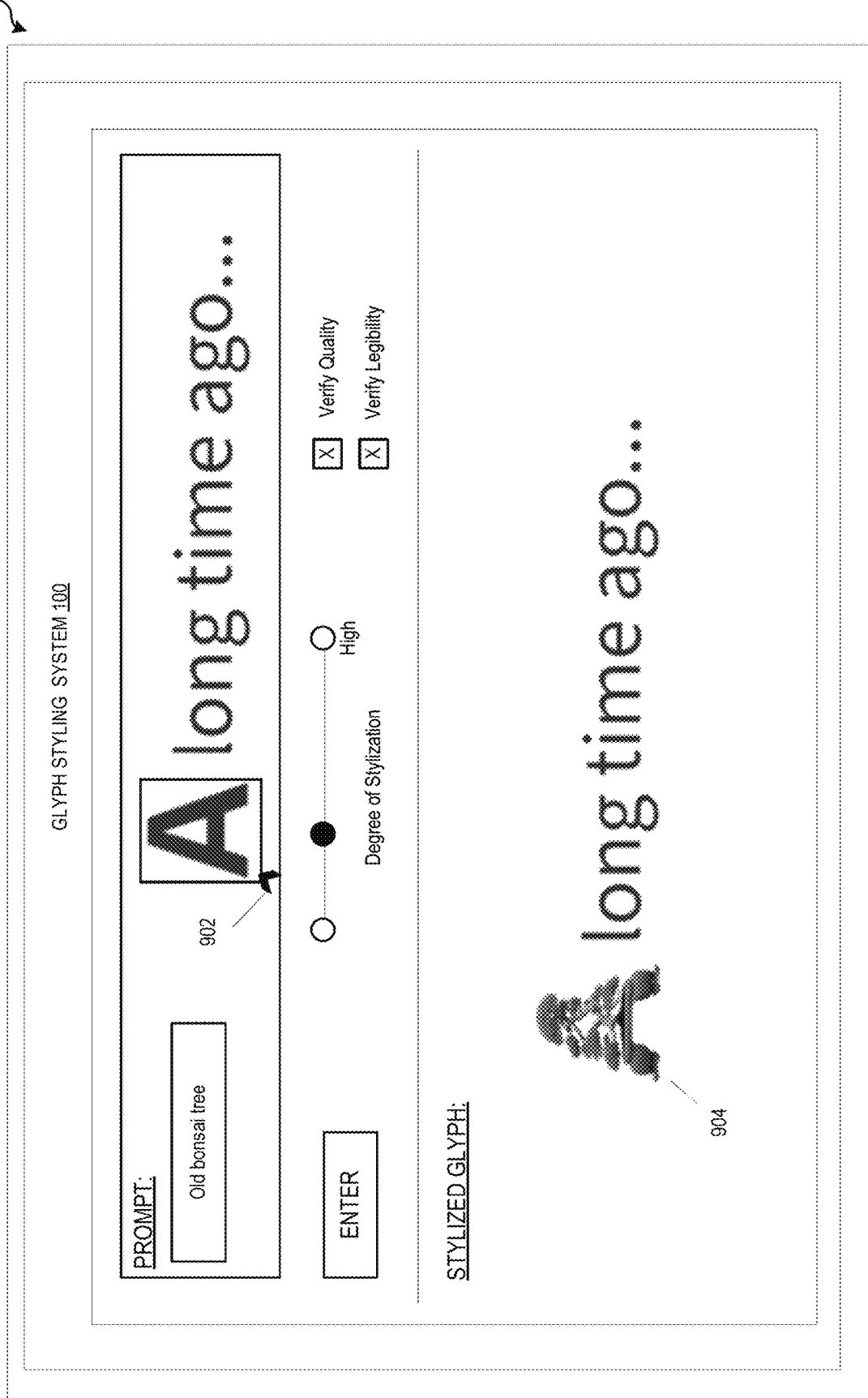
FIGS. 9A-9B illustrate an example of applying the glyph styling system to a parameterized glyph, in accordance with one or more embodiments.
Figure 9B:
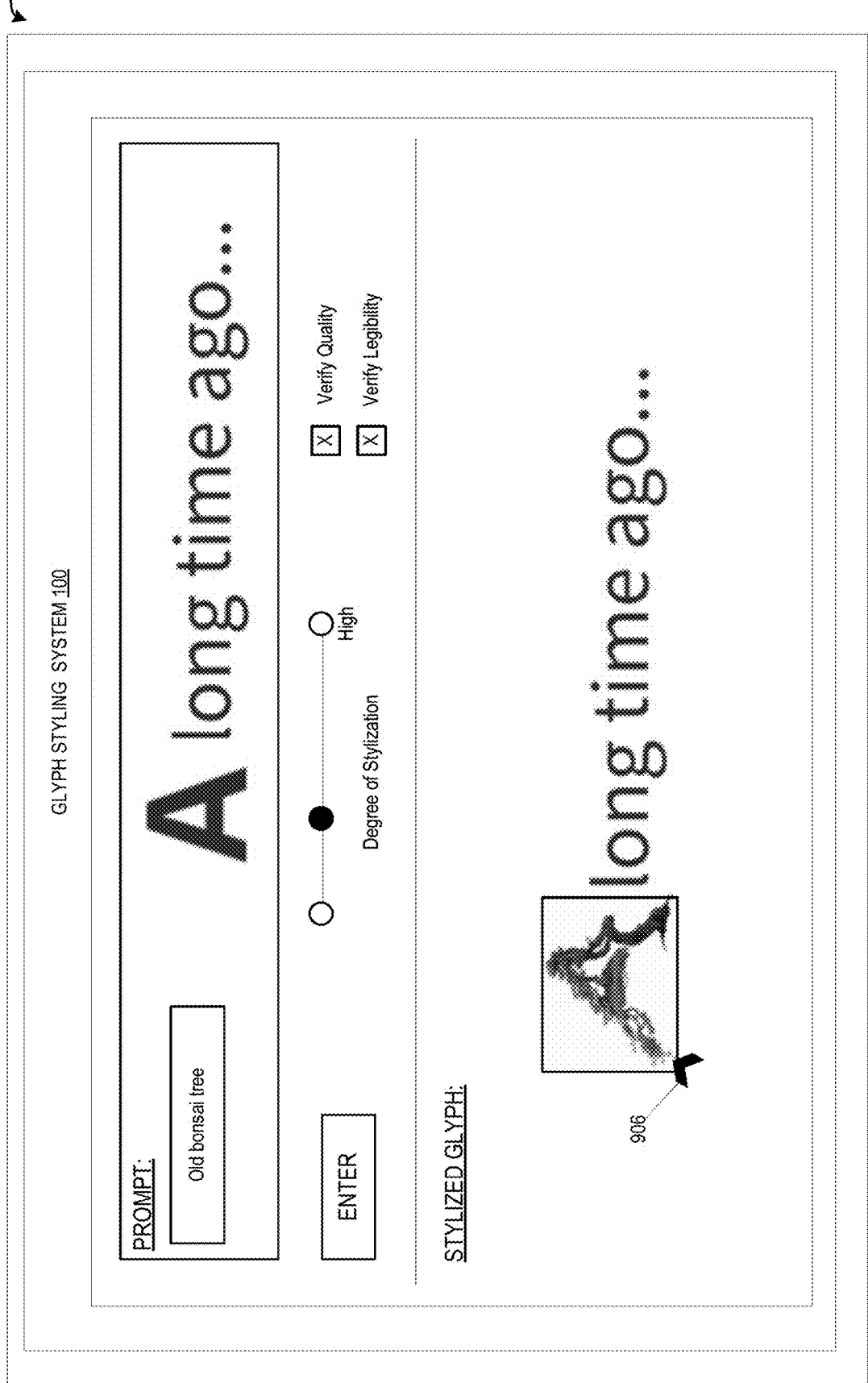

FIGS. 9A-9B illustrate an example of applying the glyph styling system to a parameterized glyph, in accordance with one or more embodiments. As described hereinlhe parameters of the glyph include the glyph font, the glyph size, and bold. As shown at 902, the selected text to be stylized is an "A," where the "A" is in a Acumin Pro Bold font. As described herein, the glyph styling system 100 is configured to receive parameters of a glyph such as the size of the glyph, bold style, italic style, underline style, font, color, etc. The prompt describing the target description states "old bonsai tree." Accordingly, the glyph styling system stylizes the bold "A" into a bonsai tree at 904 of FIG. 9A. In FIG. 9B, a user changes the font of the selected glyph at 906 from Acumin Pro Bold to Bradley Hand. As a result of the revised glyph parameter (e.g., the font), the glyph styling system 100 re-renders the stylized glyph "A" based on the modified parameter of the glyph. That is, although the prompt stayed the same (e.g., old bonsai tree), the glyph styling system was re-executed responsive to the modified font. Accordingly, the glyph styling system 100 displays a new stylized glyph based on the revised font at 906.

FIG. 10 illustrates an example of editing a stylized glyph, in accordance with one or more embodiments. As shown in example 1000, the selected glyph to be stylized includes a string of characters "TECH" in the textbox including "GOT TECH" as indicated by the user selection at 1002. The prompt of the style to be applied to the glyph is "circuitboard." It should be appreciated that the input "circuitboard" is a misspelling of "circuit board." However, the mask manager 102 is able to query the image catalog 108 and/or the image generative AI module 106 for corrected prompts. As a result, the mask manager 102 receives images of a "circuit board" that are applied to the glyph.

The glyph styling system 100 renders the string of characters "TECH" using the circuit board style as illustrated in

Figure 10A:
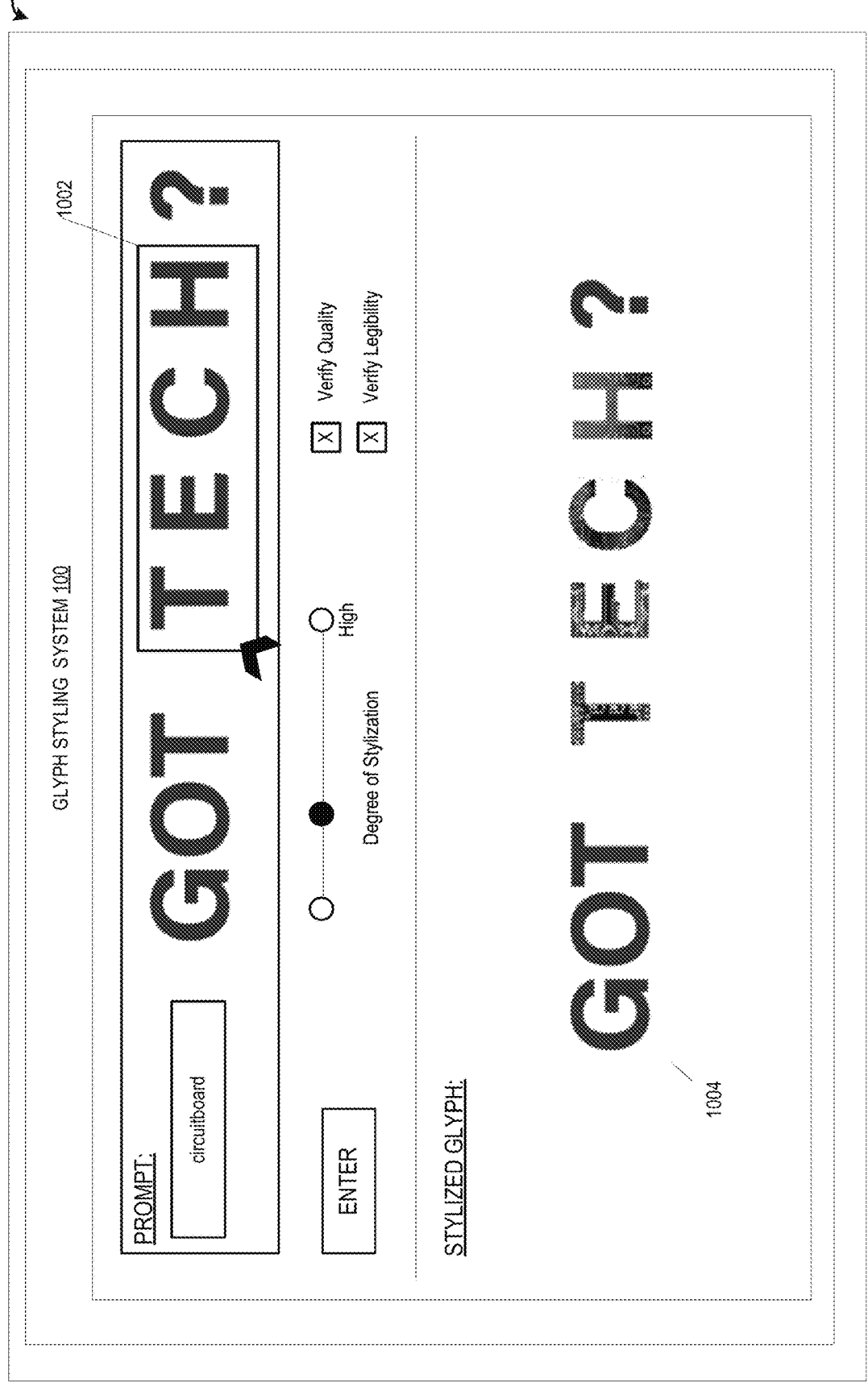
FIGS. 10A-10B illustrate an example of editing a stylized glyph, in accordance with one or more embodiments.
Figure 10B:

1004 in FIG. 10A. As illustrated in 1006 of FIG. 10B, the user edits the selected string of characters "TECH" to instead describe "RAM." As described herein, the stylized glyph 1004 is editable because the glyph data remains unicode with glyph styling. The glyph styling system 100 applies the circuit board style to the revised glyph (e.g., string of characters) while maintaining the consistency of the style. In some embodiments, the glyph styling system 100 applies the same path (provided by the path manager 402) that was generated to stylize "TECH" to "RAM" such that the revised glyph appears visually consistent with the style of the "TECH" glyph.

Figure 11:
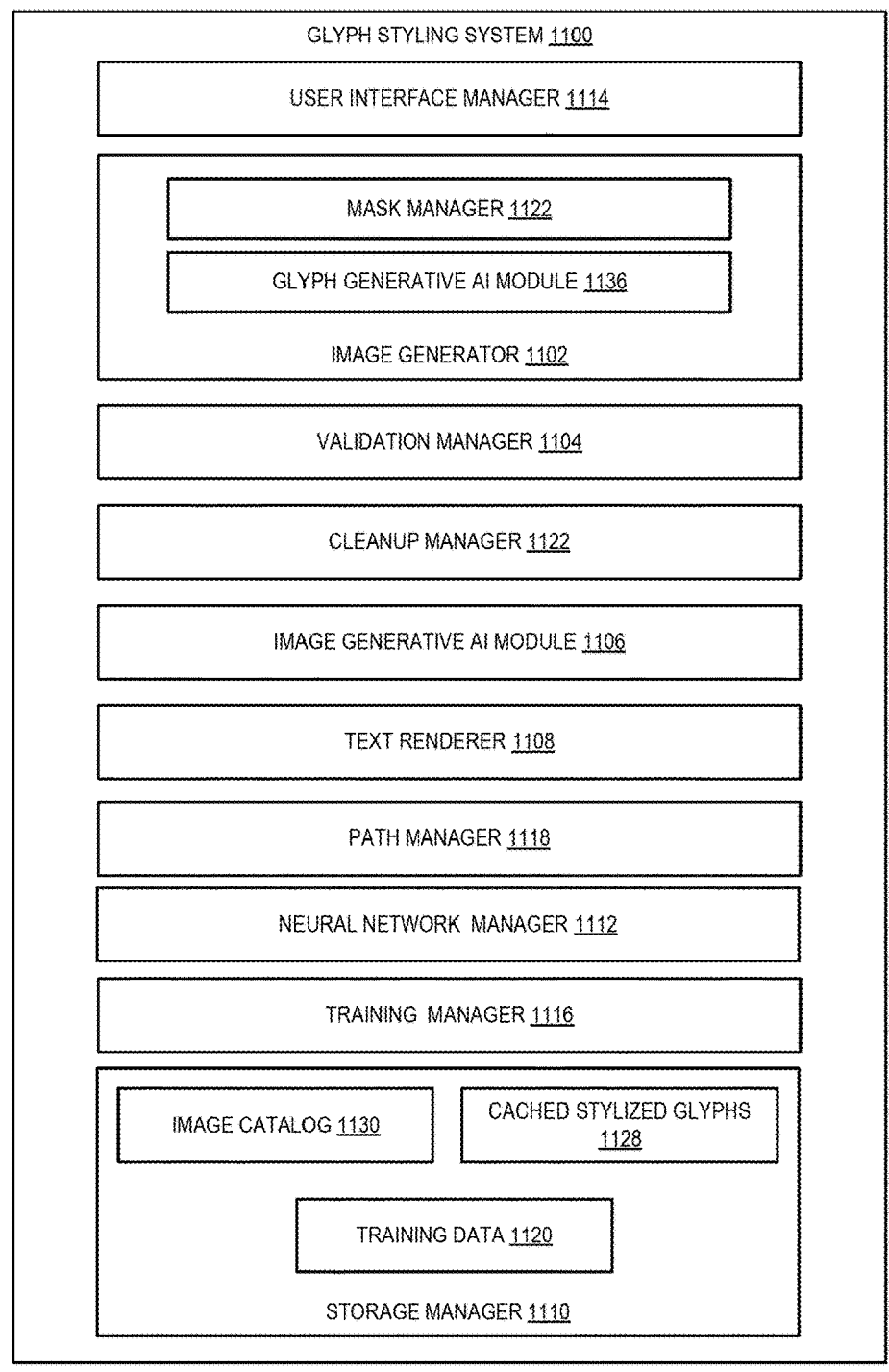
FIG. 11 illustrates a schematic diagram of a glyph styling system in accordance with one or more embodiments.

FIG. 11 illustrates a schematic diagram of glyph styling system (e.g., "glyph styling system" described above) in accordance with one or more embodiments. As shown, the glyph styling system 1100 may include, but is not limited to, a user interface manager 1114, an image generator 1102, a validation manager 1104, an image generative AI module 1106, a text renderer 1108, a path manager 1130, a neural network manager 1112, a training manager 1116, and a storage manager 1110. The image generator 1102 includes mask manager 1122 and glyph generative AI module 1136. As described herein, the validation manager 1104 includes managers such as the OCR manager, quality/constraint manager, prompt manager, threshold manager, and the like, to evaluate a stylized glyph. Additionally, the validation manager 1104 may include a glyph adjuster and glyph generative AI module to revise a stylized glyph. The storage manager 1110 includes image catalog 1118, cached stylized glyphs 1128, and training data 1120.

The glyph styling system 1100 includes a user interface manager 1114. The user interface manager 1114 allows user to provide inputs. For example, an input may include enabling the glyph styling system 1100, a selection of a glyph to be stylized, a description of a style (e.g., a prompt), one or more parameters of a selected style glyph (e.g., a size, a font, a strikethrough, an underline, a bold, an italic style, a color, a highlight, a shadow, a blur, and the like), and/or one or more parameters of the glyph styling system (e.g., a number of stylized glyphs generated by the glyph styling system, where the images for the glyph styling system are retrieved from (e.g., generated by the image generative AI module 1106, as described herein, pulled from an image catalog 1118, etc.), and the like).

As illustrated in FIG. 11, the glyph styling system 1100 also includes an image generator 1102. The image generator 1102 executes various modules to stylize glyphs using images. In operation, the image generator 1102 applies a style to a selected glyph.

In particular, a mask manager 1122 of the image generator 1102 masks a glyph. by removing a background of the glyph, applies an image to a glyph, processes the glyph (e.g., blurring the masked glyph, creates a masked noisy glyph, creates a contrasting mask, and the like). In some embodiments, the mask manager 1122 performs one or more spell checks, grammatical checks, and the like on the input (e.g., the prompt describing a style) to revise any errors in the description of the style.

The mask manager 1122 queries the image catalog 1118 and/or image generative AI module 1106 for images to be mapped to the glyph based on the prompt. In some embodiments, the mask manager 1122 queries the image generative AI module 1106 and/or the image catalog 1118 for images responsive to strings extracted from the prompt. In other embodiments, the mask manager 1122 performs any semantic similarity technique to extract semantically similar terms from the prompt. In some embodiments, the mask manager 1122 performs one or more filtering operations on the received images based on one or more constraints (e.g., parental controls) and/or user preferences (e.g., a number of stylized glyphs to be generated). In some embodiments, the mask manager 1122 passes one or more images, the masked glyph, the selected glyph, a natural language description of the target style, one or more parameters of a selected glyph, or some combination, to glyph generative AI module 1136 to further stylize the glyph.

As illustrated in FIG. 11, the glyph styling system 1100 includes one or more generative AI modules (e.g., image generative AI module 1106 and glyph generative AI module 1136). In some embodiments, the same generative AI module may be executed by the glyph styling system 1100. In other embodiments, each generative AI module is different. The generative AI module may be any generative AI configured to generate images/glyphs using a natural language prompt. One example generative AI implementation is described herein with reference to FIGS. 5 and 6.

As illustrated in FIG. 11, the glyph styling system 1100 incudes a validation manager 1104. As described herein, the validation manager 1104 executes various managers to evaluate one or more attributes of the stylized glyph. Additionally or alternatively, the validation manager 1104 executes one or more managers and a glyph adjuster/glyph generative AI module to revise a glyph based on one or more evaluated attributes of the stylized glyph.

As illustrated in FIG. 11, the glyph styling system 1100 includes a cleanup manager 1122. As described herein, the cleanup manager 1122 removes extraneous background objects from the stylized glyph, cleaning up the stylized glyph.

As illustrated in FIG. 11, the glyph styling system 1100 includes a text renderer 1108. The text renderer 1108 renders the stylized glyphs in real-time (e.g., on demand). For example, the text renderer 1108 may output glyphs in rasterized image or vector form.

As illustrated in FIG. 11, the glyph styling system 1100 also includes a path manager 1130. The path manager 1130 is configured to store a path used in rendering a stylized glyph. By storing the path used to render a stylized glyph, the glyph styling system 1100 ensures that the glyph styling system 100 is deterministic. As a result, the user receives unique and diverse stylized glyphs.

The path includes any parameters used to render a stylized glyph. For example, the path may store a seed used in the generative AI module, where a seed is an initialization state for a deterministic process. The path may also include one or more images retrieved by the mask manager 1122 that were used to mask the glyph. Additionally or alternatively, the path may include masked one or more glyphs (e.g., determined by the mask manager 1122). Also fed to the path manager 1130 are the glyph attributes such as the font, size, italic style, bold style, underline, color, etc. One or more other parameters associated with rendering a stylized glyph are also stored by the path manager 1130 such as a strength of stylization (e.g., a degree of fidelity to an image or a masked glyph).

As illustrated in FIG. 11, the glyph styling system 1100 also includes a neural network manager 1112. Neural network manager 1112 may host a plurality of neural networks or other machine learning models, such as generative AI module 1106. The neural network manager 1112 may include an execution environment, libraries, and/or any other data needed to execute the machine learning models. In some embodiments, the neural network manager 1112 may be associated with dedicated software and/or hardware resources to execute the machine learning models. As discussed, each of the generative AI modules (e.g., image generative AI module 1106 and/or glyph generative AI module 1136) can be implemented as any type of generative AI. In various embodiments, each neural network hosted by neural network manager 1112 may be the same type of neural network or may be different types of neural network, depending on implementation. Although depicted in FIG. 11 as being hosted by a single neural network manager 1112, in various embodiments the neural networks may be hosted in multiple neural network managers and/or as part of different components. For example, each generative AI module can be hosted by its own neural network manager, or other host environment, in which the respective neural networks execute, or the generative AI modules may be spread across multiple neural network managers depending on, e.g., the resource requirements of the generative AI modules, etc.

As illustrated in FIG. 11 the glyph styling system 1100 also includes training manager 1116. The training manager 1116 can teach, guide, tune, and/or train one or more neural networks. In particular, the training manager 1114 can train a neural network based on a plurality of training data. For example, the generative AI module may be trained to perform the reverse diffusion process. More specifically, the training manager 1116 can access, identify, generate, create, and/or determine training inputs and utilize the training inputs to train and fine-tune a neural network.

As illustrated in FIG. 11, the glyph styling system 1100 also includes the storage manager 1110. The storage manager 1110 maintains data for the glyph styling system 1100. The storage manager 1110 can maintain data of any type, size, or kind as necessary to perform the functions of the glyph styling system 1100. The storage manager 1110, as shown in FIG. 11, includes image catalog 1118, cached stylized glyphs 1128, and training data 1120.

The image catalog 1118 is a data store of images accessible to the mask manager 1122. As described, in some embodiments, the image catalog 1118 is stored by the styling glyph system 1100 as data in the storage manager 1110. The image catalog 1118 may include uploaded images by one or more users, computer-generated images, images that may be purchased, and the like. In some embodiments, the image catalog is configured to query one or more additional systems for images. The storage manager 1110 may also store cached stylized glyphs 1128. As described herein, stylized glyphs 1128 may be cached such that the text renderer 1108 does not need to ren-render stylized glyphs that have been previously rendered. Accordingly, the text renderer 1108 pulls the stylized glyph from the cache. Training data 1120 is also stored by the storage manager 1110. Training data 1120 includes manually labeled data for supervised learning. Training using supervised learning is part of the training performed during semi-supervised learning.

Each of the components of the glyph styling system 1100 and their corresponding elements (as shown in FIG. 11) may be in communication with one another using any suitable communication technologies. It will be recognized that although components and their corresponding elements are shown to be separate in FIG. 11, any of components and their corresponding elements may be combined into fewer components, such as into a single facility or module, divided into more components, or configured into different components as may serve a particular embodiment.

The components and their corresponding elements can comprise software, hardware, or both. For example, the components and their corresponding elements can comprise one or more instructions stored on a computer-readable storage medium and executable by processors of one or more computing devices. When executed by the one or more processors, the computer-executable instructions of the glyph styling system 1100 can cause a client device and/or a server device to perform the methods described herein. Alternatively, the components and their corresponding elements can comprise hardware, such as a special purpose processing device to perform a certain function or group of functions. Additionally, the components and their corresponding elements can comprise a combination of computer-executable instructions and hardware.

Furthermore, the components of the glyph styling system 1100 may, for example, be implemented as one or more stand-alone applications, as one or more modules of an application, as one or more plug-ins, as one or more library functions or functions that may be called by other applications, and/or as a cloud-computing model. Thus, the components of the glyph styling system 1100 may be implemented as a stand-alone application, such as a desktop or mobile application. Furthermore, the components of the glyph styling system 1100 may be implemented as one or more web-based applications hosted on a remote server. Alternatively, or additionally, the components of the glyph styling system 1100 may be implemented in a suite of mobile device applications or "apps."

As shown, the glyph styling system 1100 can be implemented as a single system. In other embodiments, the glyph styling system 1100 can be implemented across multiple systems. For example, one or more functions of the glyph styling system 1100 can be performed by one or more servers, and one or more functions of the glyph styling system 1100 can be performed by one or more client devices.

For example, upon a client device accessing a webpage or other web application hosted at the one or more servers, in one or more embodiments, the one or more servers can provide access to a user interface displayed at a client device prompting a user for an input description of a target style. The client device can provide the input to the one or more servers and indicate one or more selected glyphs for the target style to be applied to. Additionally or alternatively, the client device may communicate a glyph for the target style to be applied to. Upon receiving the inputs (e.g., the description of the target style, a selection of a glyph, and/or a input glyph), the one or more servers can automatically perform the methods and processes described above to render a stylized glyph according to the target style. The one or more servers can provide access to the user interface displayed at the client device with the stylized glyph. The client device can be used to receive user inputs modifying one or more glyphs to be styled (e.g., a selection of a glyph to be stylized, adding new glyphs to be stylized by entering glyphs into a text box, etc.) and/or modifying the description of the target style. The client device communicates such modifications to the one or more server. Upon receiving the modifications, the one or more servers automatically perform the methods and processes described above to stylize the glyphs (e.g., stylize added glyphs, stylize a selected glyph, generate a new style applied to the glyphs, etc.).

Figure 12:
FIG. 12 illustrates a flowchart of a series of acts in a method of providing stylized glyphs given a description of a target style in accordance with one or more embodiments.
Figure 12:
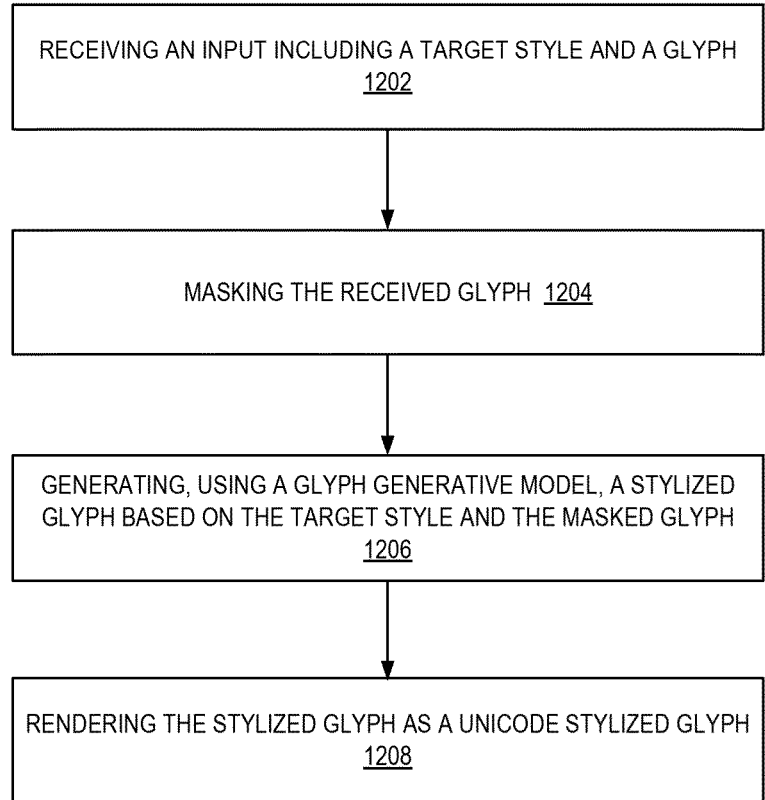

FIGS. 1-11, the corresponding text, and the examples, provide a number of different systems and devices that allows a user to create one or more stylized glyphs. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of providing stylized glyphs given a description of a target style in accordance with one or more embodiments. In one or more embodiments, the method 1200 is performed in a digital medium environment that includes the glyph styling system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of receiving an input including a target style and a glyph. The target style (otherwise referred to herein as a prompt) may be an arbitrary string of descriptive text that is used to generate a stylized rendition of a glyph. A glyph, as described herein, is a portion of a character, a character, one or more strings, or an entire text box. In some embodiments, the target style includes a description of the glyph to be stylized. In other embodiments, the glyph is selected and indicated to be a glyph to be stylized.

The method 1200 also includes an act 1204 of masking the received glyph. Masking the glyph includes removing a background of the glyph. Additionally or alternatively, the glyph may be processed in other ways. For example, an image may be applied to the glyph (or the masked glyph). The image applied to the masked glyph may be one or more patterns, one or more colors, one or more textures, and/or one or more composed scenes. In one embodiment, the image is applied to the masked glyph by cutting the image such that the shape (e.g., dimensions or size) of the image are equal to the shape of the masked glyph. Subsequently, the image cutout is applied to the masked glyph. Additionally or alternatively, a processed masked glyph may be created by performing a blur operation on the masked glyph with the applied image. By blurring the masked glyph, a generative AI module receiving the blurred masked glyph is able to generate styles that are not limited to the bounds of the mask. Additionally or alternatively, as described herein, a noisy mask may be generated by injecting noise into the masked glyph. Additionally or alternatively, as described herein, a contrasting mask is created by applying a contrastive background to the masked glyph.

The method 1200 also includes an act 1206 of generating, using a glyph generative model, a stylized glyph based on the target style and the masked glyph. In operation, the glyph generative model generates a stylized glyph using the received masked glyph (e.g., the contrasting mask, the masked glyph with the image applied, the noisy masked glyph, or any other processing performed on the glyph as described above), the prompt (e.g., the natural language description of the target style received as part of the input), and/or any other parameters received as part of the input (e.g., color, font, highlight, shadow, bold, size, etc.). By providing such inputs, the glyph generative model is encouraged to stylize the glyph in the shape of the received masked glyph. In operation, the glyph generative AI module 116 generates the stylized glyph in latent space.

The method 1200 also includes an act 1208 of rendering the stylized glyph as a unicode stylized glyph. The stylized glyphs are unicode such that the stylized glyph is an editable character, string, emoji, and the like. As described herein by creating stylized glyphs in unicode, the content of the stylized glyph is editable.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
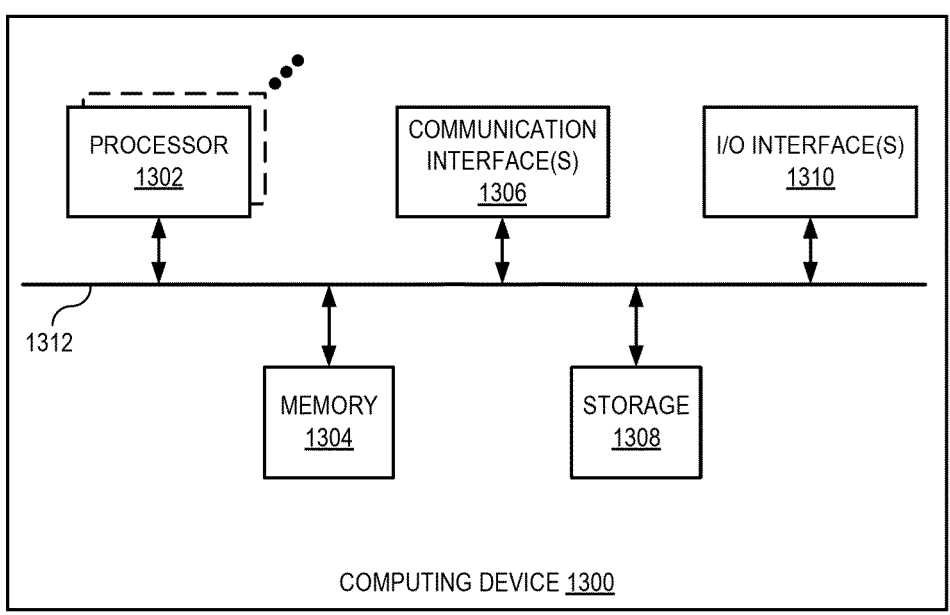
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that one or more computing devices such as the computing device 1300 may implement the glyph styling system. As shown by FIG. 13, the computing device can comprise a processor 1302, memory 1304, one or more communication interfaces 1306, a storage device 1308, and one or more I/O devices/interfaces 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1308 and decode and execute them. In various embodiments, the processor(s) 1302 may include one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 can further include one or more communication interfaces 1306. A communication interface 1306 can include hardware, software, or both. The communication interface 1306 can provide one or more interfaces for communication (such as, for example, packet-based communication) between the computing device and one or more other computing devices 1300 or one or more networks. As an example and not by way of limitation, communication interface 1306 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

The computing device 1300 includes a storage device 1308 includes storage for storing data or instructions. As an example, and not by way of limitation, storage device 1308 can comprise a non-transitory storage medium described above. The storage device 1308 may include a hard disk drive (HDD), flash memory, a Universal Serial Bus (USB) drive or a combination these or other storage devices. The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 may include a mouse, keypad or a keyboard, a touch screen, camera, optical scanner, network interface, modem, other known I/O devices or a combination of such I/O devices/interfaces 1310. The touch screen may be activated with a stylus or a finger.

The I/O devices/interfaces 1310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a string of natural language text describing a target style and a glyph;
   masking the received glyph;
   inputting the string of natural language text describing the target style and the glyph into a glyph generative model;
   generating, by the glyph generative model, a stylized glyph using the string of natural language text describing the target style and the glyph via diffusion; and
   rendering the stylized glyph as a unicode stylized glyph.

2. The method of claim 1, further comprising:
   obtaining an image based on the target style; and
   applying the image to the received glyph.

3. The method of claim 2, wherein obtaining the image based on the target style includes at least one of:
   generating the image based on the target style using an image generation machine learning model, or
   retrieving the image based on the target style using an image catalog.

4. The method of claim 1, further comprising:
   performing processing on the masked glyph, wherein the processing includes at least one of:
   blurring the masked glyph, or
   injecting noise into the masked glyph.

5. The method of claim 1, further comprising:
   applying a contrastive background to the masked glyph using an inverse of a parameter of the input and an inverse of the masked glyph.

6. The method of claim 1, further comprising:

removing a background of the stylized glyph to obtain a subject of the stylized glyph; and displaying the subject of the stylized glyph.

7. The method of claim 1, further comprising:

caching the stylized glyph; and responsive to receiving another input including the received glyph, displaying the cached stylized glyph.

8. The method of claim 1, further comprising:

storing a seed of the glyph generative model, wherein the seed is an initialization state of the glyph generative model.

9. The method of claim 1, further comprising:

evaluating an attribute of the stylized glyph, wherein the attribute is at least one of a readability attribute, a quality attribute, or a prompt similarity attribute.

10. The method of claim 9, further comprising:

determining to revise the stylized glyph responsive to the attribute of the stylized glyph not satisfying a threshold; and generating an adjusted stylized glyph using the stylized glyph, wherein the adjusted stylized glyph is generated by comparing a pixel of the stylized glyph to a glyph in an alphabet and adding or removing the pixel based on the comparison.

11. The method of claim 1, wherein diffusion further comprises:

obtaining initialized noise; and iteratively denoising the initialized noise based on the natural language text describing the target style and the glyph.

12. A system comprising:

a memory component; and a processing device coupled to the memory component, the processing device to perform operations comprising:

receiving a string of natural language text describing a target style and a glyph;

masking the received glyph;

inputting the string of natural language text describing the target style and the glyph into a glyph generative model;

generating, by the glyph generative model, a stylized glyph using the string of natural language text describing the target style and the glyph via diffusion; and rendering the stylized glyph as a unicode stylized glyph.

13. The system of claim 11, further comprising:

generating an image based on the target style using an image generation machine learning model, or retrieving the image based on the target style using an image catalog; and applying the image to the received glyph.

14. The system of claim 12, wherein the processing device further performs operations comprising:

performing processing on the masked glyph, wherein the processing includes at least one of:

blurring the masked glyph, or injecting noise into the masked glyph.

15. A non-transitory computer-readable medium storing executable instructions, which when executed by a processing device, cause the processing device to perform operations comprising:

generating, by a glyph generative model, a stylized glyph using a received string of natural language text describing a target style and a target glyph via diffusion;

determining whether the stylized glyph is validated using an attribute of the stylized glyph and a validation algorithm evaluating a quality of the stylized glyph; and rendering the stylized glyph responsive to determining that the stylized glyph is validated.

16. The non-transitory computer-readable medium of claim 15, wherein the attribute is a readability attribute and wherein the quality of the stylized glyph is based on an optical character recognition algorithm recognizing the stylized glyph, the optical character recognition algorithm being the validation algorithm.

17. The non-transitory computer-readable medium of claim 15, wherein the attribute is a quality attribute and wherein the quality of the stylized glyph is based on an object recognition algorithm recognizing the stylized glyph, the object recognition algorithm being the validation algorithm.

18. The non-transitory computer-readable medium of claim 15, wherein the attribute is a prompt similarity attribute and wherein the quality of the stylized glyph is based on a similarity of a generated description determined by a descriptive model and the target style, the descriptive model being the validation algorithm.

19. The non-transitory computer-readable medium of claim 15, storing executable instructions that further cause the processing device to perform operations comprising:

determining that the stylized glyph is not validated using the attribute of the stylized glyph; and revising the stylized glyph such that the stylized glyph is validated using the attribute.

20. The non-transitory computer-readable medium of claim 15, wherein revising the stylized glyph includes comparing a pixel of the stylized glyph to a glyph in an alphabet and adding or removing the pixel based on the comparison.

* * * * *